United States Patent

Masuda

[11] Patent Number: 6,055,341
[45] Date of Patent: *Apr. 25, 2000

[54] DEVICE AND METHOD FOR READING COLOR IMAGES

[75] Inventor: Syuzo Masuda, Saijo, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/919,172

[22] Filed: Aug. 28, 1997

Related U.S. Application Data

[63] Continuation of application No. 08/489,840, Jun. 13, 1995, abandoned.

[30] Foreign Application Priority Data

Jul. 19, 1994 [JP] Japan ................................ 6-166649

[51] Int. Cl.⁷ .................................................. G06K 7/00
[52] U.S. Cl. ........................................ 382/312; 250/208.1
[58] Field of Search ............................ 358/505, 509–515; 348/342, 273, 268, 272, 274–280; 250/208–1

[56] References Cited

U.S. PATENT DOCUMENTS 4,783,696  11/1988  Neumann et al. .................... 358/75
5,329,384  7/1994  Setani ............................... 358/514
5,481,381  1/1996  Fujimoto .

FOREIGN PATENT DOCUMENTS 360079866  5/1985  Japan ................................ 358/509

Primary Examiner—Jerome Grant, II
Attorney, Agent, or Firm—Staas & Halsey LLP

[57] ABSTRACT

A device for reading color images comprises an optical input unit, an optical resolution unit and a photoelectric conversion unit. The optical input unit has a constant valid reading width for inputting three colors of RGB at the same time. A first optical path radiates a RGB light inputted from the optical input unit. A second optical path radiates a RGB light inputted from the optical input unit in a path different from the first optical path. A third optical path radiates a RGB light inputted from the optical input unit in a path different from the first and the second optical path. The optical resolution unit receives three RGB lights that are incidented into the optical input unit through the first, the second and the third optical path to resolve one of the three RGB lights into a R light, resolve one of the remaining two RGB lights into a G light and resolve the other one into a B light. The photoelectric conversion unit has a R reading pixel, a G reading pixel and a B reading pixel corresponding to the R light, the G light and the B light obtained in the optical resolution unit, and converts the R light, the G light and the B light into a R signal, a G signal and a B signal.

15 Claims, 19 Drawing Sheets

DEVICE AND METHOD FOR READING COLOR IMAGES

This application is a continuation of application Ser. No. 08/489,840, filed Jun. 13, 1995, now abandoned.

BACKGROUND OF THE INVENTION

The present invention relates to a device and a method for reading color images by resolving three colors of RGB into a R light, a G light and a B light.

In a color scanner, a light source irradiates a light to a manuscript and a charge is accumulated in a Charge Coupled device (referred to as CCD hereinafter) by the light reflected from the manuscript.

Then, the charge is read as a color image. The volume of accumulated charge is small compared with the volume of the light received from the manuscript when the CCD is used. Namely, a device for reading color images whose sensitivity of the CCD was improved has been adopted, since the sensitivity of the CCD was deteriorated.

The device for reading color images reads a color image by resolving three colors of R (red), G (green) and B (blue) reflected from the manuscript into each color, when the light source irradiates the manuscript. Up to the present, the following methods of every kind have existed as methods for resolving the RGB.

For instance, the device for reading color images shown in FIG. 17 comprises a R light source 31R having a wavelength of R light, a G light source 31G having a wavelength of G light and a B light source 31B having a wavelength of B light. The light of each light source reflected from the manuscript 18 is inputted into CCD 35 through a lens 34 in order, when the R light source 31R, the G light source 31G and the B light source 31 B are switched on in order.

Then, a color image (a color signal) consisting of a R signal, a G signal and a B signal is obtained from the CCD 35.

In addition, a device for reading color images shown in FIG. 18 includes a daylight fluorescent lamp 11 having a wavelength of RGB light. In the device for reading color images, an optical resolution filter 33 for the R light, the G light and the B light is installed between the lens 34 and the CCD 35. The optical resolution filter 33 is moved synchronizing it with the reading of the color image.

Hereupon, an optical resolution filter 33R resolves the R light from the RGB light radiated from the daylight fluorescent lamp 11, when the optical resolution filter 33R is arranged on an optical path. An optical resolution filter 33G resolves the G light from the RGB light beamed from the daylight fluorescent lamp 11, when the optical resolution filter 33G is arranged on the optical path.

An optical resolution filter 33B resolves the B light from the RGB light beamed from the daylight fluorescent lamp 11, when the optical resolution filter 33B is arranged on the optical path. A color image consisting of a R signal, a G signal and a B signal is obtained from the CCD 35.

Further, the device for reading color images shown in FIG. 19 comprises a daylight fluorescent lamp 11 CCD 35R, a CCD 35G and a CCD 35B for the RGB, and a R resolution reflection filter 37R, a G resolution reflection filter 37G and a B resolution reflection filter 37B corresponding to the CCDs. The resolution reflection filters reflect only specific wavelengths and are called a dichroic mirror.

As shown in FIG. 20A, the B resolution reflection filter 37B permeates the G light and the R light of the RGB light beamed from the lens 34, and reflects only the B light to transmit the reflected B light to the CCD 35B.

As shown in FIG. 20B, the G resolution reflection filter 37G permeates the B light and the R light of the RGB light beamed from the lens 34, and reflects only the G light to transmit the reflected G light to the CCD 35G.

As shown in FIG. 20C, the R resolution reflection filter 37R permeates the B light and the G light of the RGB light beamed from the lens 34, and reflects only the R light to transmit the reflected R light to the CCD 35R. As mentioned hereinbefore, the color image consisting of the R signal, the G signal and the B signal can be obtained by using the three CCDs.

However, a device for reading color images shown in FIG. 17 needs three light sources for the RGB. Accordingly, the device is high-priced and will be oversized. Besides, in a line-sequential scanning method suitable for image processing for obtaining a color image of the RGB per line, it is necessary to switch on the light source at a high speed. However, it was difficult to read the color image at a high speed, since the activation is slowed down due to the afterglow of the light source.

Further, a device for reading color images shown in FIG. 18 needs such moving parts as a motor which moves the optical resolution filter. Besides, in the line-sequential scanning method, it was necessary to move the optical resolution filter at a high speed synchronizing it with the reading of the color image.

Further, a device for reading color images shown in FIG. 19 needs three CCDs. Accordingly, the device will be oversized and will be high-priced. In this case, three more optical paths are needed, and the construction will be more complicated.

SUMMARY OF THE INVENTION

An object of the present invention is to provide a device and a method for reading color images whose constructions are simple, and which are low-priced and are capable of reading color images.

The device for reading color images of the present invention comprises an optical input unit, three different optical paths from a first optical path to a third optical path, an optical resolution unit and a photoelectric conversion unit. The device for reading color images formed a R light, a G light and a B light as images in the photoelectric conversion unit without moving the optical resolution unit by using the optical resolution unit, the three different optical paths and the photoelectric conversion unit.

The optical input unit has a constant valid reading width for inputting three colors of RGB at the same time. The first optical path radiates a RGB light inputted from the optical input unit. The second optical path radiates a RGB light inputted from the optical input unit in a path different from the first optical path. The third optical path radiates a RGB light inputted from the optical input unit in a path different from the first optical path and the second optical path.

The optical resolution unit receives three RGB lights that are incidented into the optical input unit through the first optical path, the second optical path and the third optical path to resolve one of the three RGB lights into a R light, resolve one of the remaining two RGB lights into a G light and resolve the other one into a B light.

The photoelectric conversion unit has a R reading pixel, G reading pixel and a B reading pixel corresponding to the R light, the G light and the B light obtained in the optical resolution unit, and converts the R light and the G light and the B light into a R signal, a G signal and a B signal.

Although the device for reading color images of the present invention consists of the above-mentioned essential components, it will be organized even if the components are concretely as follows.

The optical input unit has two reflection units making them face each other at a distance of the valid reading width on the both sides. The first optical path radiates a RGB light inputted from the valid reading width directly to the optical resolution unit.

The second optical path reflects the RGB light radiated from the optical input unit in one of the two reflection units and radiates it to the optical resolution unit, and the RGB light of the second optical path is thought as if it had come straight from the aerially existing aerial optical input unit which is adjacent to the one reflection unit and whose width is the same as the valid reading width, when the second optical path is viewed reversely from the optical resolution unit.

The third optical path reflects the RGB light inputted from the optical input unit in the other one of the two reflection units and radiates the reflected RGB light to the optical resolution unit, and the RGB light of the third optical path is thought as if it had come straight from the aerially existing aerial optical input unit which is adjacent to the other reflection unit and whose width is the same as the valid reading width, when the third optical path is viewed reversely from the optical resolution unit.

In addition, the device for reading color images can be provided with a condensing unit which condenses the R light, the G light and the B light obtained in the optical resolution unit into the photoelectric conversion unit.

Further, the photoelectric conversion unit can be composed of a charge coupled device for one scanning line which is constructed by arranging the each pixel in one scanning direction.

In addition, the device for reading color images can be provided with a control unit which obtains a color image of one line by reading the R signal, the G signal and the B signal of one scanning line converted by the photoelectric conversion unit at the same time.

Further, the device for reading color images can be provided with a reflection mirror for changing optical paths which reflects the three RGB lights of the first optical path, the second optical path and the third optical path so that the three RGB lights will be changed directing to the optical resolution unit, when the optical input unit and the optical resolution unit are not arranged facing each other.

In addition, the optical resolution unit comprises a R resolution filter, a G resolution filter and a B resolution filter. The width of each resolution filter can be set to the width which is wider than the width when the RGB light of the optical path corresponding to the filter passes through the filter.

Further, in the device for reading color images, the optical resolution unit can receive three RGB lights that are incidented into the optical input unit through the first optical path, the second optical path and the third optical path to resolve one of the three RGB lights into the R light, resolve one of the remaining two RGB lights into the G light and resolve the other one into the B light, when the optical input unit and the photoelectric conversion unit are not arranged facing each other.

In addition, an optical resolution reflection filter which reflects the resolved R light, G light and B light so that the R light, the G light and the B light will be changed directing to the photoelectric conversion unit can be substituted for the optical resolution unit.

Further, the optical resolution reflection filter can comprise a R resolution reflection filter which resolves the RGB light into the R light and reflects the resolved R light, a G resolution reflection filter which resolves the RGB light into the G light and reflects the resolved G light and a B resolution reflection filter which resolves the RGB light into the B light and reflects the resolved B light. The width of each resolution filter can be set to the width which is wider than the width when the RGB light of the optical path corresponding to the filter passes through the filter.

Further, the one of the two reflection units is the first resolution reflection filter which resolves the RGB light of the second optical path into one of the R light, the G light and the B light and reflects the resolved light, when the optical input unit and the photoelectric conversion unit are not arranged facing each other.

The other one of the two reflection units is the second resolution reflection filter which resolves the RGB light of the third optical path into one of the remaining two lights except one light resolved by the first resolution reflection filter and reflects resolved light. The optical resolution unit comprises a third resolution reflection filter, a first reflection mirror and a second reflection mirror.

The third resolution reflection filter resolves the RGB light of the first optical path into light of the other one except the two resolved lights, and reflects the resolved light toward the photoelectric conversion unit. The first reflection mirror reflects the light reflected from the first resolution reflection filter toward the photoelectric conversion unit. The second reflection mirror reflects the light reflected from the second resolution reflection filter toward the photoelectric conversion unit.

Besides, the width of the third resolution reflection filter is set to the width which is wider than the width when the RGB light of the first optical path passes through the filter. The widths of the first and the second reflection mirror are set to the width which is wider than the width when the light reflected from the resolution reflection filter corresponding to the reflection mirror is reflected by the reflection mirror.

Further, the optical resolution reflection filter is composed of a dichroic mirror.

Besides, a method for reading color images of the present invention comprises an optical input step, a branching step, a resolution step and a conversion step. The optical input step inputs three colors of RGB at the same time in a constant valid reading width.

The branching step radiates the RGB light which is inputted by the valid reading width in three different optical paths from the first optical path to the third optical path, and branches the RGB light into three lights.

The resolution step resolves one of the three RGB lights into a R light, resolves one of the remaining two RGB lights into a G light and resolves the other one into a B light. The conversion step converts the resolved R light, G light and B light into a R signal, a G signal and a B signal respectively.

Besides, the first optical path radiates the RGB light inputted by the valid reading width directly. Simultaneously with the outgoing radiation of the first optical path, the second optical path reflects the RGB light inputted by the valid reading width in one of the two reflection units arranged facing each other at a distance of the valid reading width, and radiates the reflected RGB light. The RGB light of the second optical path is thought as if it had come straight from the aerially existing aerial reading width which is adjacent to the one reflection unit and whose width is the same as the valid reading width, when the second optical path is viewed reversely from the side of the resolved light.

Simultaneously with the outgoing radiation of the second optical path, the third optical path reflects the RGB light inputted by the valid reading width in the other one of the two reflection units, and reflects the reflected RGB light. The RGB light of the third optical path is thought as if it had come straight from the aerially existing aerial reading width which is adjacent to the other reflection unit and whose width is the same as the valid reading width, when the third optical path is viewed reversely from the side of the resolved light.

Further, the conversion step condenses the resolved R light, G light and B light and converts the condensed R light, G light and B light into a R signal, a G signal and a B signal respectively.

Further, the resolution step reflects three RGB lights of the first optical path, the second optical path and the third optical path by the reflection mirror for changing the optical paths, resolves one of the reflected three RGB lights into a R light, resolves one of the remaining two RGB lights into a G light and resolves the other one into a B light.

Besides, the resolution step resolves one of the three RGB lights into a R light by an optical resolution reflection filter, resolves one of the remaining two RGB lights into a G light and resolves the other one into a B light and reflects the resolved R light, G light and B light at the same time. The conversion step converts the reflected R light, G light and B light into a R signal, a G signal and a B signal respectively.

Further, the resolution step resolves the RGB light of the second optical path into one of the R light, the G light and the B light and reflects the resolved light by one resolution unit. Simultaneously with the reflection, the resolution step resolves the RGB light of the third optical path into one of the remaining two lights except one light resolved by the one reflection unit and reflects the resolved light by the other reflection unit.

The resolution step resolves the RGB light of the first optical path into the other one except the resolved two lights by the optical resolution reflection filter, and reflects the resolved light by an optical resolution reflection filter. Simultaneously with the reflection, the resolution step further reflects the two lights resolved and reflected in the second and the third optical path by a reflection mirror. The conversion step converts the reflected R light, G light and B light into a R signal, a G signal and a B signal respectively.

According to the device for reading color images of the present invention, the first optical path radiates the RGB light inputted from the optical input unit to the optical resolution unit, when the optical input unit inputs three colors of RGB at the same time in a constant valid reading width. The second optical path radiates the RGB light inputted from the optical input unit to the optical resolution unit in a path different from the first optical path. The third optical path radiates the RGB light inputted from the optical input unit to the optical resolution unit in a path different from the first and the second optical path.

Then, the optical resolution unit resolves one of the three RGB lights inputted from the first, the second and the third optical path into a R light, resolves one of the remaining two RGB lights into a G light and resolves the other one into a B light. The photoelectric conversion unit converts the R light, the G light and the B light obtained by the optical resolution unit into a R signal, a G signal and a B signal at the same time.

Namely, the color images can be read at a high speed without moving the optical resolution unit, since the R signal, the G signal and the B signal can be obtained at the same time in one photoelectric conversion unit.

Besides, the two reflection units are arranged facing each other at a distance of the valid reading width on the both sides of the optical input unit. The first optical path radiates the RGB light inputted from the valid reading width directly to the optical resolution unit. The second optical path reflects the RGB light inputted from the optical input unit in one of the two reflection units and radiates the reflected RGB light to the optical resolution unit, and the third optical path reflects the RGB light inputted from the optical input unit in the other one of the two reflection units and radiates the reflected RGB light to the optical resolution unit. Accordingly, the color images can be read at a high speed without moving the optical resolution unit.

The R signal, the G signal and the B signal can be obtained at the same time, since the condensing unit condenses the R light, the G light and the B light obtained by the optical resolution unit into the photoelectric conversion unit.

The color images can be read at a high speed in one scanning and the construction will be simple, since the photoelectric conversion unit is composed of a charge coupled device for one scanning line which is constructed by arranging the each pixel in one scanning direction. The color image of one line can be obtained, since the control unit read the R signal, the G signal and the B signal converted by the photoelectric conversion unit at the same time.

The space of the device for reading color images can be kept small, since the reflection mirror for changing optical paths reflects the three RGB lights of the first optical path, the second optical path and the third optical path so that they will be changed directing to the optical resolution unit, when the optical input unit and the optical resolution unit are not arranged facing each other.

The RGB light can be resolved into each light without fail, since the width of each resolution filter is set to the width which is wider than the width when the RGB light of the optical path corresponding to the filter passes through the filter.

The optical resolution reflection filter resolves one of the three RGB lights into a R light, resolves one of the remaining two RGB lights into a G light and resolves the other one into a B light, when the optical input unit and the photoelectric conversion unit are not arranged facing each other. The space of the device can be kept small, since the optical resolution reflection filter reflects the resolved R light, G light and B light so that they will be changed directing to the photoelectric conversion unit.

The RGB light can be resolved into each light without fail, since the width of each resolution is set to the width which is wider than the width when the RGB light of the optical path corresponding to the filter passes through the filter.

The first resolution reflection filter resolves the RGB light of the second optical path into one of the R light, the G light and the B light and reflects the resolved light, when the optical input unit and the photoelectric conversion unit are not arranged facing each other. The second resolution reflection filter resolves the RGB light of the third optical path into one of the remaining two lights and reflects the resolved light.

Then, the third resolution reflection filter resolves the RGB light of the first optical path into the other one except the resolved two lights and reflects the resolved light toward the photoelectric conversion unit. The first reflection mirror reflects the light reflected from the first resolution reflection filter toward the photoelectric conversion unit. The R signal, the G signal and the B signal can be obtained at a high speed without moving the third resolution reflection filter, the first and the second reflection mirror, and the space of the device can be kept small, since the second reflection mirror reflects the light reflected from the second resolution reflection filter toward the photoelectric conversion unit.

The width of the third resolution reflection filter is set to the width which is wider than the width when the RGB light of the first optical path passes through the filter. The RGB light can be resolved into each light without fail and the resolved light can be reflected, since the widths of the first and the second reflection mirror are set to the width which is wider than the width when the light reflected from the resolution reflection filter corresponding to the reflection mirror is reflected by the reflection mirror.

BRIEF DESCRIPTION OF THE DRAWINGS

FIG. 20C is a diagram indicating a R resolution reflection filter.

DETAILED DESCRIPTION OF THE PREFERRED EMBODIMENTS

Figure 1:
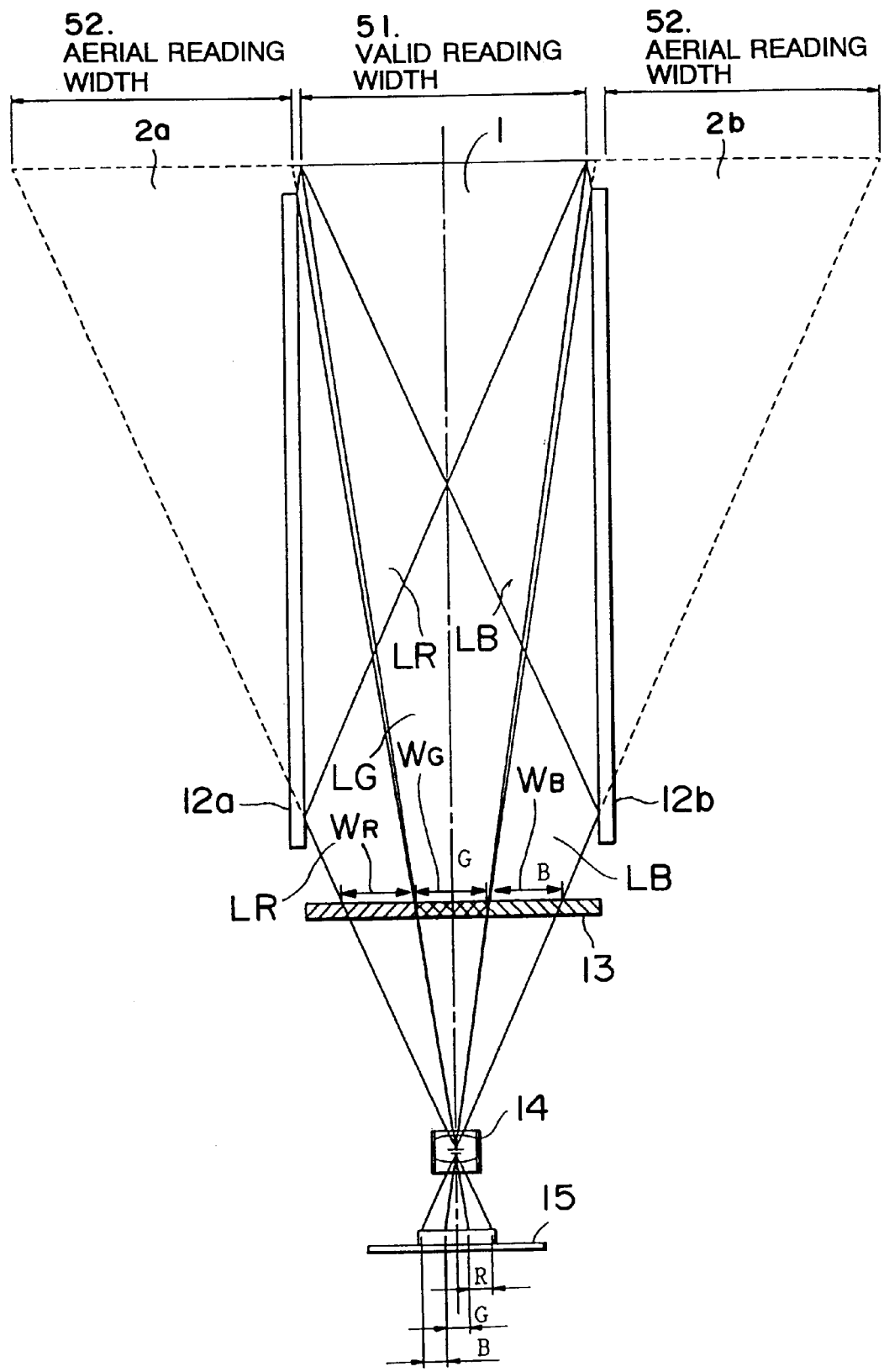
FIG. 1 is a construction diagram indicating a device for reading color images according to the embodiment 1 of the present invention.

The concrete embodiments of a device and a method for reading color images of the present invention will be described as follows. FIG. 1 is a construction diagram indicating a device for reading color images according to the embodiment 1 of the present invention.

The device for reading color images comprises an optical input unit 1, two reflection units 12a and 12b, an optical resolution unit 13, a condensing unit 14 and a photoelectric conversion unit 15.

The device for reading color images forms a R light, a G light and a B light as images in the photoelectric conversion unit without moving the optical resolution unit 13 by using the optical resolution unit 13, the different three optical paths LG, LR and LB which are formed by the two reflection units 12a and 12b and the photoelectric conversion unit 15.

The optical input unit 1 has a constant valid reading width 51 for inputting three colors of RGB at the same time. Hereupon, the three colors of RGB can be obtained from a daylight fluorescent lamp and so on. The valid reading width 51 consists with the width of the reading object. The valid reading width is, for instance, the width of the manuscript.

The optical input unit 1 has two reflection units 12a and 12b making them face each other at a distance of the valid reading width on the both sides. The first optical path LG radiates the RGB light inputted from the valid reading width 51 directly to the optical resolution unit 13.

The second optical path LR radiates the RGB light inputted from the optical input unit 1 in a path different from the first optical path LG. In this example, the two reflection units 12a and 12b are used for forming the second optical path LR and the third optical path LB. Namely, the second optical path LR reflects the RGB light inputted from the optical input unit 1 by the one reflection unit 12a, and radiates the reflected light to the optical resolution unit 13.

The RGB light of the second optical path LR is thought as if it had come straight from the aerially existing aerial optical input unit 2a unit which is adjacent to the one reflection unit 12a and whose width is the same as the valid reading width 51, when the second optical path LR is viewed reversely from the optical resolution unit 13.

The third optical path LB radiates the RGB light inputted from the optical input unit in a path different from the first optical path LG and the second optical path LR. In this example, the third optical path LB reflects the RGB light inputted from the optical input unit 1 by the other reflection unit 12b, and radiates the reflected RGB light to the optical resolution unit 13.

The RGB light of the third optical path LB is thought as if it had come straight from the aerially existing aerial optical input unit 2b which is adjacent to the other reflection unit 12b and whose width is the same as the valid reading width 51, when the third optical path LB is viewed reversely from the optical resolution unit 13.

The optical resolution unit 13 receives three RGB lights which are incidented into the optical input unit 1 through the first optical path LG, the second optical path LR and the third optical path LB to resolve one of the three RGB lights into a R light, resolve one of the remaining two RGB lights into a G light and resolve the other one into a B light. The optical resolution unit 13 is an optical resolution filter and so on.

The condensing unit 14 condenses the R light, the G light and the B light obtained in the optical resolution unit 13 into the photoelectric conversion unit 15. The condensing unit 14 is, for instance, a lens.

The photoelectric conversion unit 15 has a R reading pixel, a G reading pixel and a B reading pixel corresponding to the R light, the G light and the B light obtained in the optical resolution unit, and converts the R light, the G light and the B light into a R signal, a G signal and a B signal. The photoelectric conversion unit 15 is, for instance, a charge coupled device (CCD) and so on.

Figure 2:
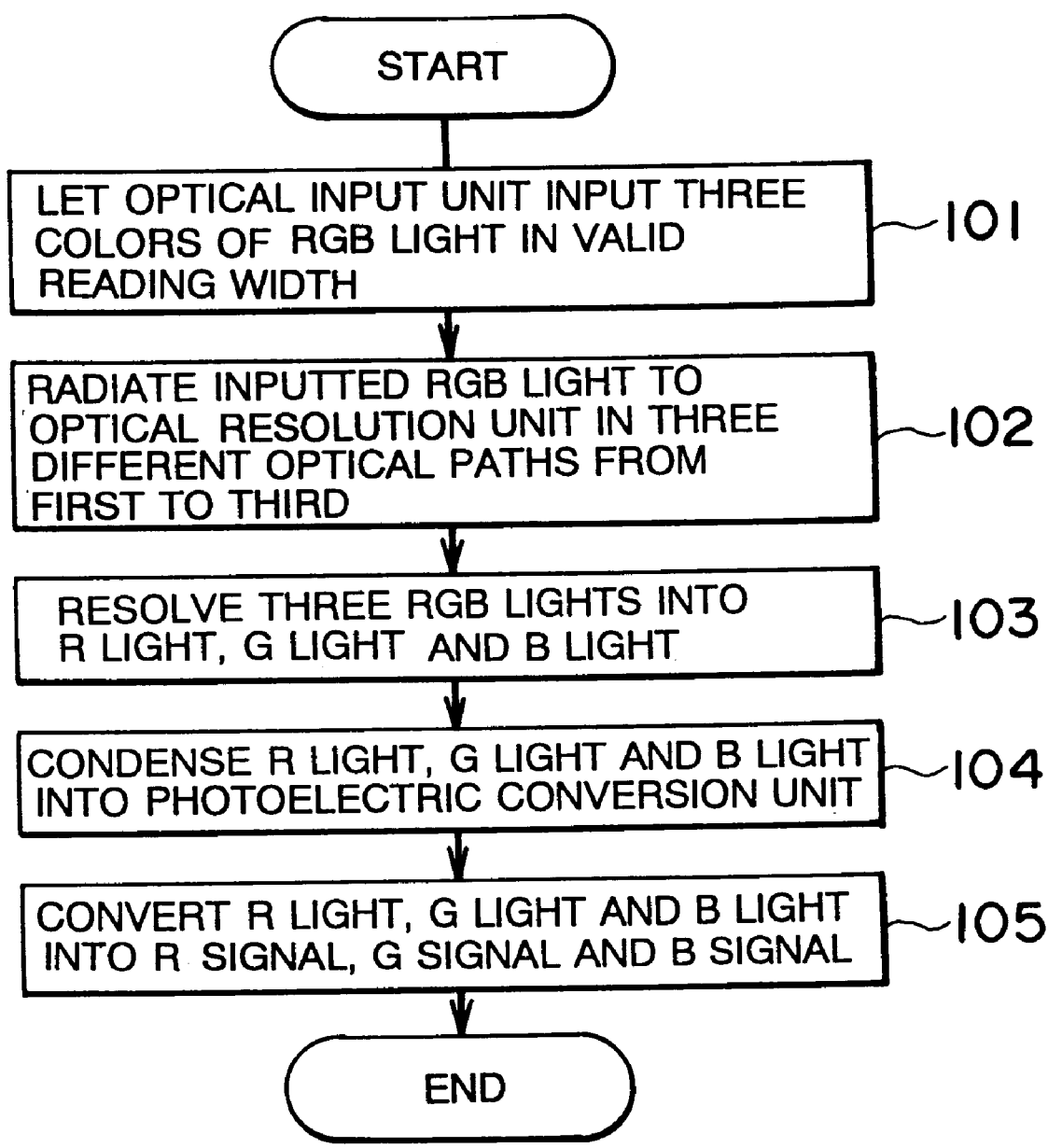
FIG. 2 is a flowchart indicating a method for reading color images according to a first embodiment of the present invention.

Then, the method for reading color images of the embodiment 1 will be described by referring to FIG. 1 and FIG. 2.

First of all, the first optical path LG radiates the RGB light inputted from the optical input unit 1 to the optical resolution unit 13, when the optical input unit 1 inputs three colors of RGB at the same time in a constant valid reading width 51 (Step 101).

The second optical path LR radiates the RGB light inputted from the optical input unit 1 to the optical resolution unit 13 in a path different from the first optical path by the reflection unit 12a. The third optical path LB radiates the RGB light inputted from the optical input unit 1 to the optical resolution unit 13 in a optical path LB different from the first optical path LG and the second optical path LR by the reflection unit 12b.

Namely, the RGB light inputted by the valid reading width 51 is radiated in three different paths of the first optical path LG, the second optical path LR and the third optical path LB, and the RGB light is branched into three lights (Step 102).

Further, the optical resolution unit 13 receives three RGB lights which are incidented into the optical input unit 1 through the first optical path LG, the second optical path LR and the third optical path LB. Then, the optical resolution unit 13 resolves one of the three RGB lights into a R light, resolves one of the remaining two RGB lights into a G light and resolves the other one into a B light (Step 103).

Further, the condensing unit 14 condenses the R light, the G light and the B light obtained by the optical resolution unit 13 into the photoelectric conversion unit 15 (Step 104). The photoelectric conversion unit 15 converts the R light, the G light and the B light obtained by the optical resolution unit 13 through the condensing unit 14 into a R signal, a G signal and a B signal at the same time (Step 105).

Namely, the color images can be read at a high speed without moving the optical resolution unit 13, since the R signal, the G signal and the B signal can be obtained at the same time in one photoelectric conversion unit 15.

<EMBODIMENT 2>

Figure 3:
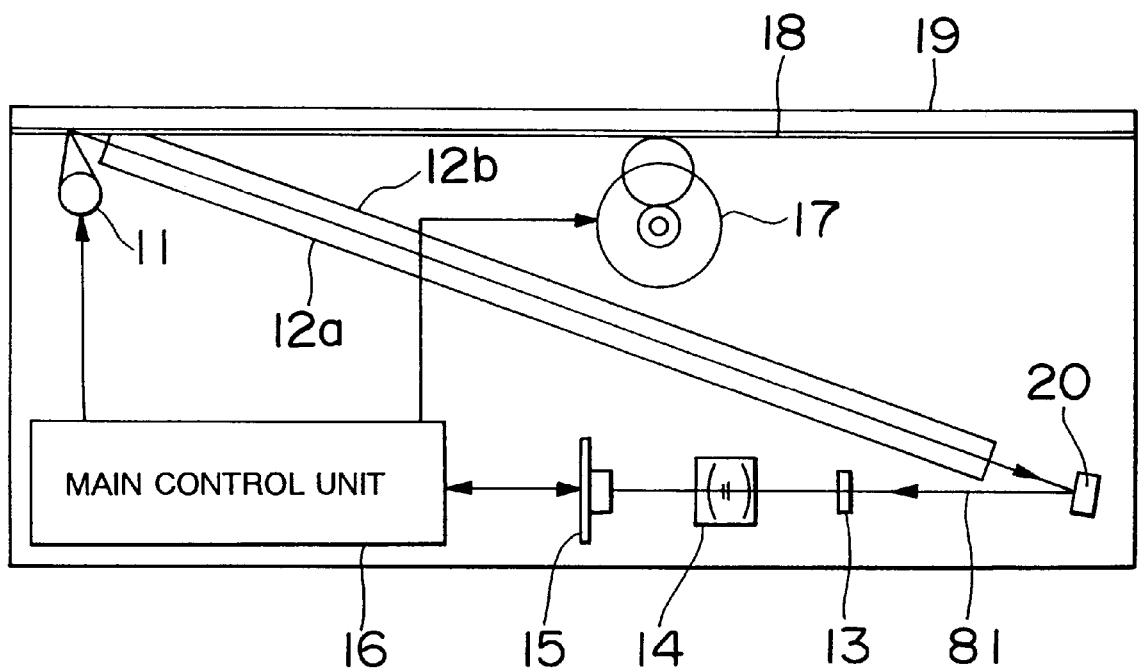
FIG. 3 is a construction diagram indicating a device for reading color images according to the a second embodiment of the present invention.

FIG. 3 is a construction diagram indicating a device for reading color images according to the embodiment 2 of the present invention. In FIG. 3, the device for reading color images comprises a manuscript cover 19 for covering a color-printed manuscript 18 and a manuscript-platform-moving-unit 17 including a motor for moving the manuscript 18 to the right and left directions and so on. The manuscript 18 is caught between the manuscript cover 19 and an unillustrated reading cover glass.

Besides, a daylight fluorescent lamp 11 is arranged on the lower part of the print plane side of the manuscript 18 in the device for reading color images. An aerial reading reflection mirror (a reflection unit) 12a and 12b are arranged near the manuscript 18. Further, a reflection mirror 20 for changing optical paths is arranged facing the aerial reading reflection mirrors 12a and 12b in the device for reading color images.

An optical resolution filter 13, a lens 14 and a CCD 15 are arranged on the optical path formed by the reflection mirror 20 for changing optical paths. A main control unit 16 is connected to the CCD 15.

The daylight fluorescent lamp 11 is a light source having a wavelength of three colors of RGB, and irradiates the manuscript 18. The aerial reading reflection mirrors 12a and 12b input the RGB light reflected from the manuscript 18.

Figure 4:
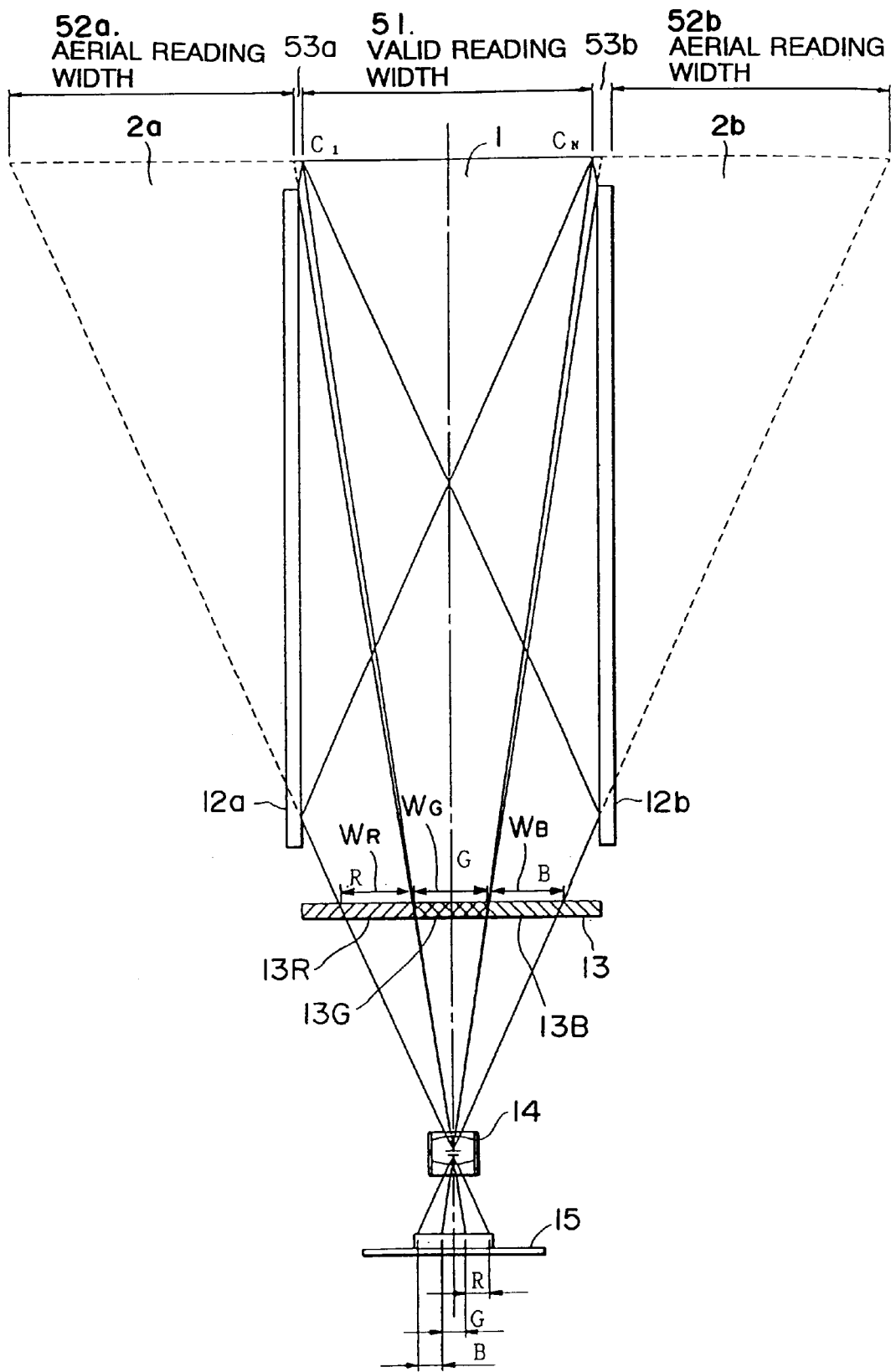
FIG. 4 is a construction diagram indicating the principle parts of the device for reading color images according to the second embodiment of the present invention.

FIG. 4 is a construction diagram indicating the principle parts of the device for reading color images. In FIG. 4, the optical input unit 1 has a fixed valid reading width 51 for inputting three colors of RGB at the same time. The optical input unit 1 has the aerial reading reflection mirrors 12a and 12b making them face each other at a distance of the valid reading width 51 on the both sides.

The aerial reading reflection mirrors 12a and 12b are total reflection mirrors, and the inside of the each reflection mirror is metal-plated for the total reflection. The aerial reading reflection mirrors 12a and 12b radiates the RGB light incorporated by the valid reading width 51 to the optical resolution filter 13 in three different paths LG, LB and LR from the first to the third.

Figure 5:
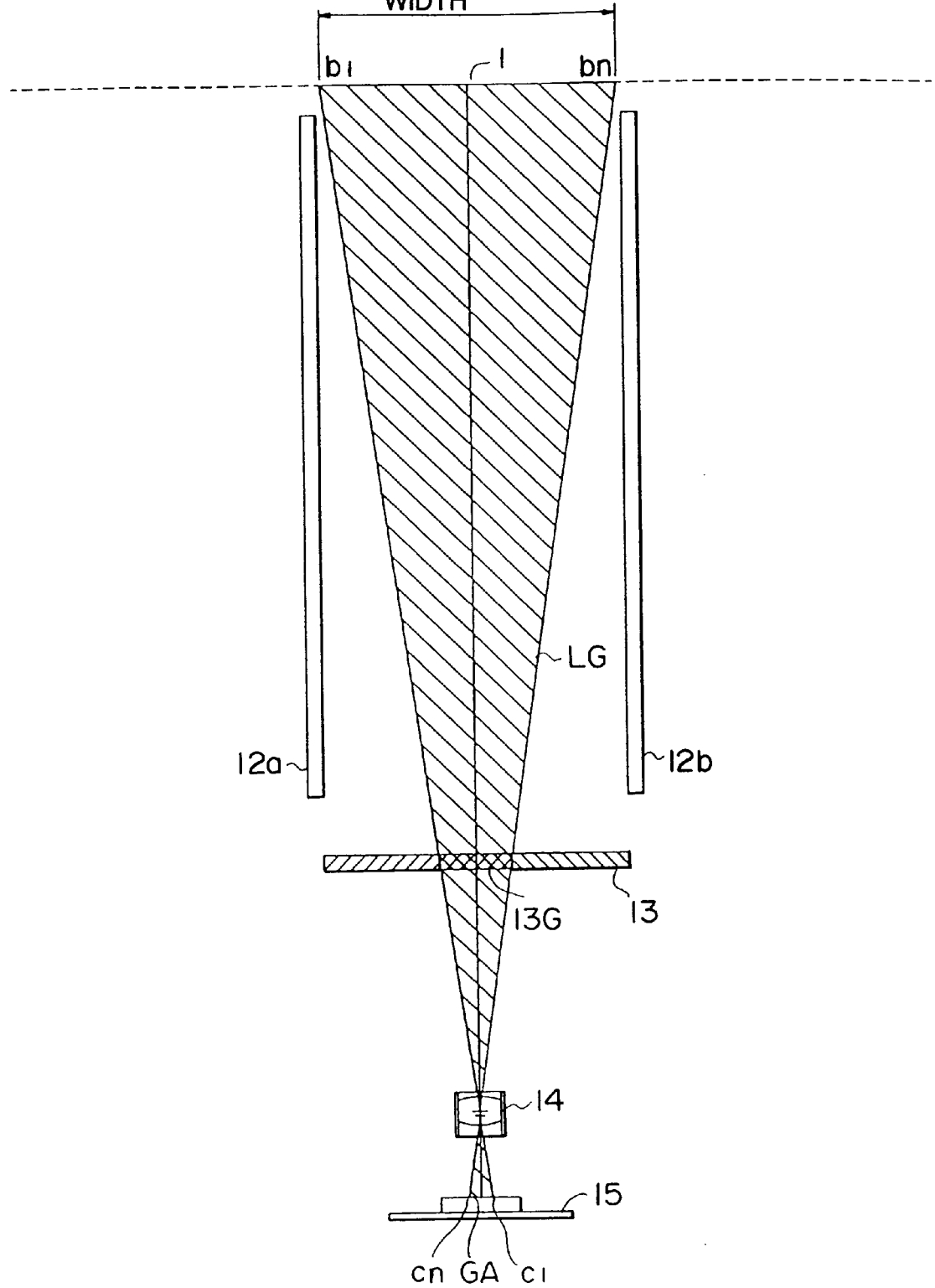
FIG. 5 is a diagram indicating a reading of a G signal of the second embodiment of the present invention.

As shown in FIG. 5, the first optical path LG radiates the RGB light inputted from the valid reading width 51 directly to the optical resolution filter 13.

Figure 7:
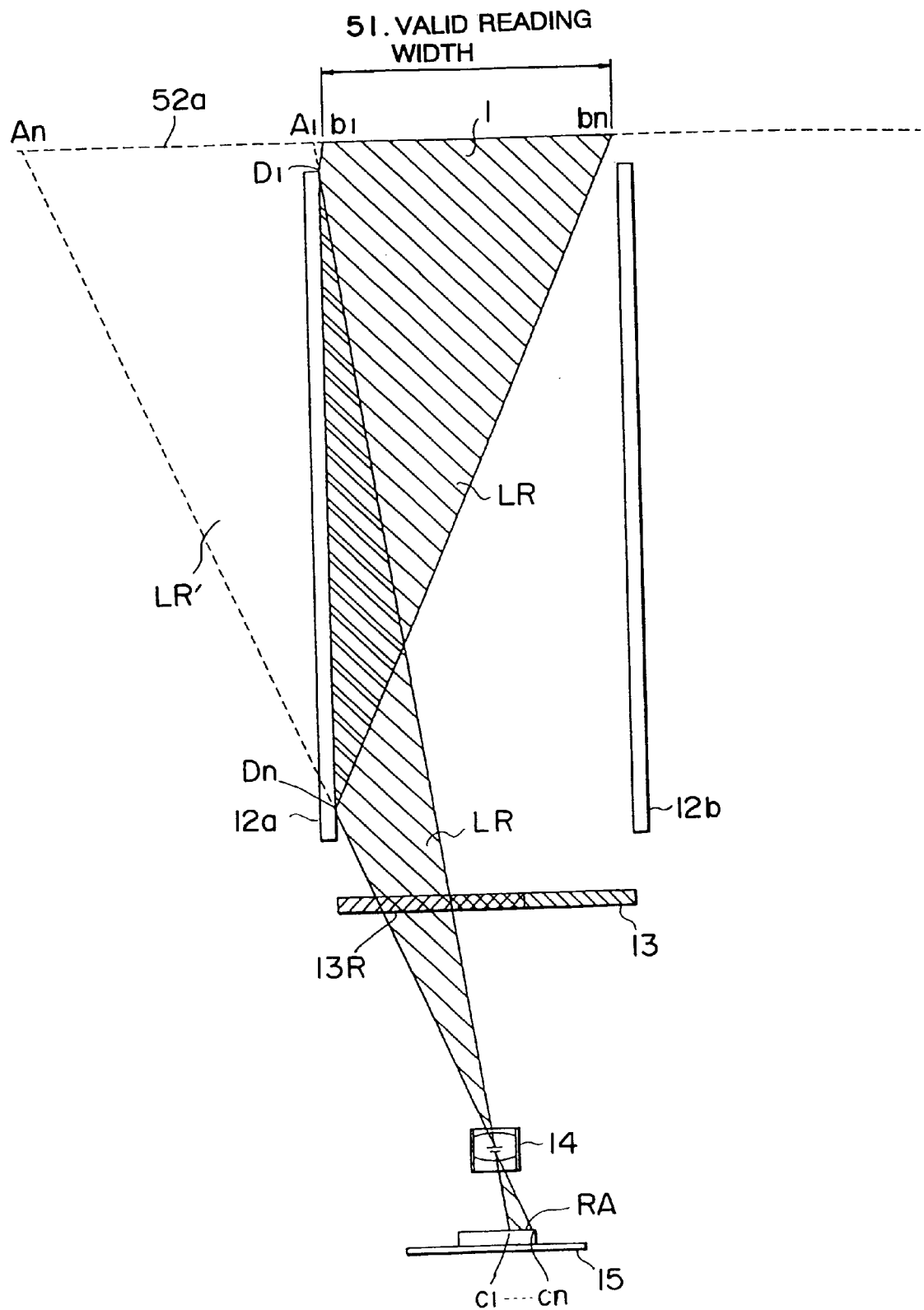
FIG. 7 is a diagram indicating a reading of a R signal of the second embodiment of the present invention.
Figure 8:
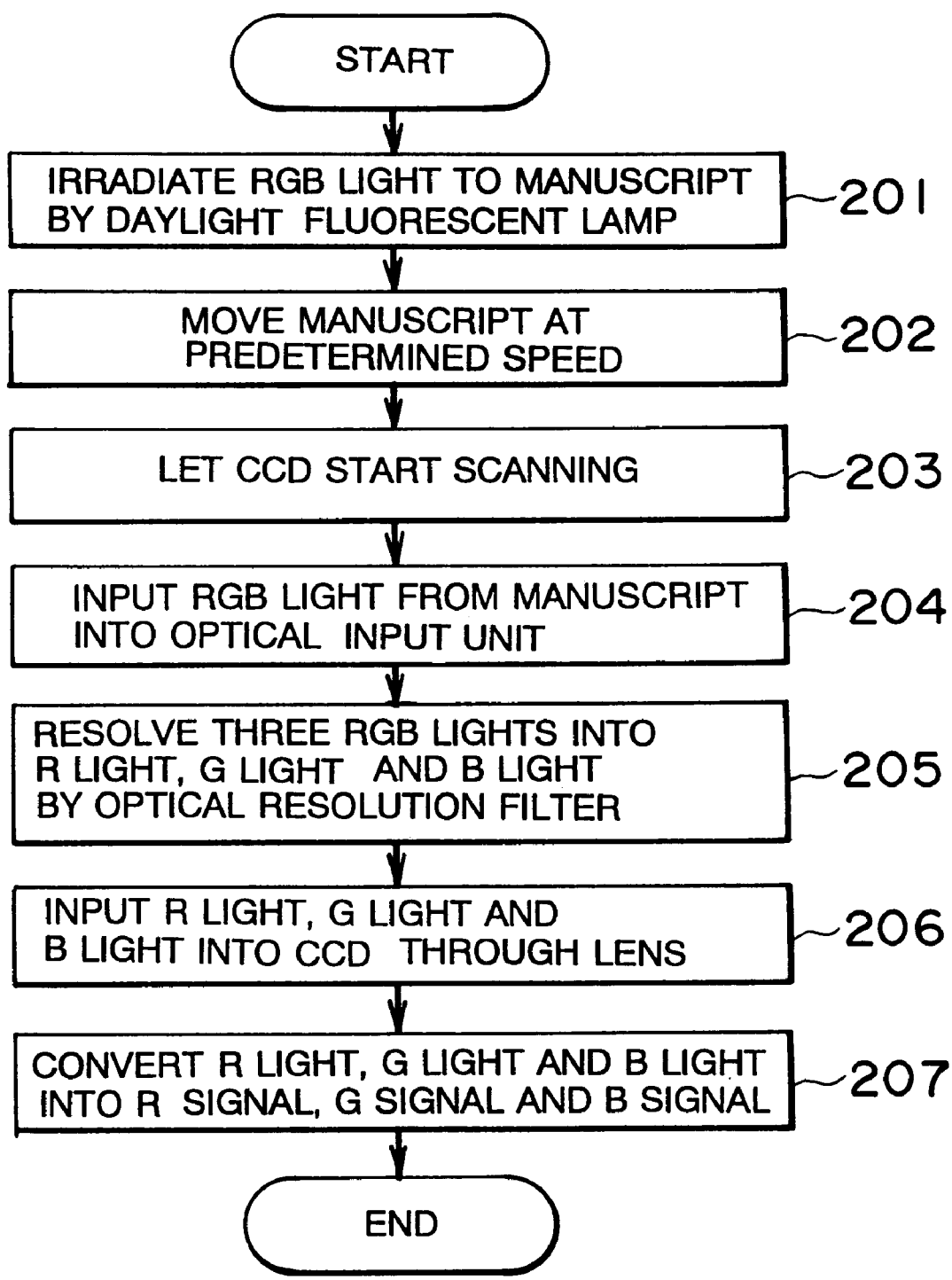
FIG. 8 is a flowchart indicating a method for reading color images according to the second embodiment of the present invention.

As shown in FIG. 7, the second optical path LR reflects the RGB light inputted from the optical input unit 1 by the aerial reading reflection mirror 12a, and radiates the reflected RGB light to the optical resolution filter 13. By these actions, the RGB light of the second optical path is thought as if it had come straight from the aerially existing aerial optical input unit 2a which is adjacent to the aerial reading reflection mirror 12a and whose width is the same as the valid reading width 51, when the second optical path is viewed reversely from the optical resolution filter 13.

Figure 6:
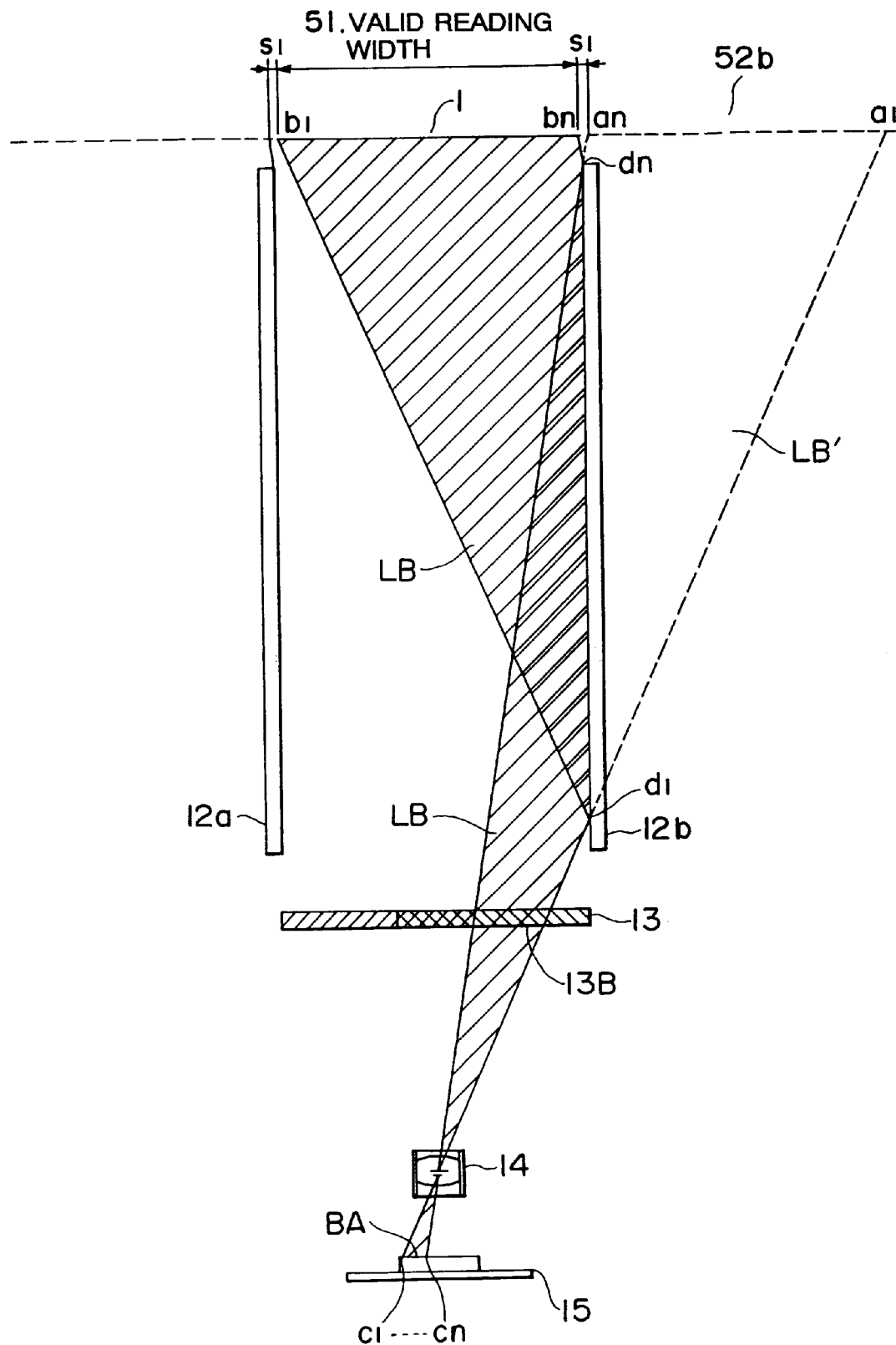
FIG. 6 is a diagram indicating a reading of a B signal of the second embodiment of the present invention.

As shown in FIG. 6, the third optical path LB reflects the RGB light inputted from the optical input unit 1 by the aerial reading reflection mirror 12b, and radiates the reflected RGB light to the optical resolution filter 13. By these actions, the RGB light of the third optical path is thought as though it had come straight from the aerially existing aerial optical input unit 2b which is adjacent to the aerial reading reflection mirror 12b and whose width is the same as the valid reading width 51, when the third optical path is viewed reversely from the optical resolution filter 13.

The reflection mirror 20 shown in FIG. 3 reflects each RGB light of the optical path LG, the optical path LB and the optical path LR within the aerial reading reflection mirrors 12a and 12b so that each RGB light will be changed directing to the optical resolution filter 13.

The space of the device for reading color images can be kept small, since each of the optical resolution filter 13, the lens 14 and the CCD 15 is arranged on the side of the aerial reading reflection mirrors 12a and 12b by including the reflection mirror 20 on the device.

The optical resolution filter 13 receives the three RGB lights which are incidented into the optical input unit 1 through the first optical path, the second optical path and the third optical path to resolve one of the three RGB lights into a R light, resolve one of the remaining two RGB lights into a G light and resolve the other one into a B light.

The optical resolution filter 13 comprises a R resolution filter 13R, a G resolution filter 13G and a B resolution filter 13B. The G resolution filter 13G resolves the RGB light of the optical path LG inputted from the valid reading width 51 into a G light. Hereupon, the width of the G resolution filter 13G is set to the width which is wider than the width WG when the RGB light of the optical path corresponding to the filter passes through the filter.

The R resolution filter 13R resolves the RGB light of the second optical path LR formed by the aerial reading reflection mirror 12a into a R light. Hereupon, the width of the R resolution filter 13 R is set to the width which is wider than the width WR when the optical path LR passes through the filter.

The B resolution filter 13B resolves the RGB light of the third optical path LR formed by the aerial reading reflection mirror 12b into a B light. Hereupon, the width of the B resolution filter 13B is set to the width which is wider than the width $W_B$ when the optical path LB2 passes through the filter.

The lens 14 is capable of resolving the reading width which is at least three times wider than the valid reading width of the manuscript 18, and condenses the R light, the G light and the B light resolved by the optical resolution filter 13 into the CCD 15.

The CCD 15 has a R reading pixel, a G reading pixel and a B reading pixel corresponding to the R light, the G light and the B light obtained by the optical resolution filter 13 through the lens 14, and converts the R light, the G light and the B light into a R signal, a G signal and a B signal.

CCD 15 consists of one-dimensional line (one horizontal line) in which a plurality of pixels are arranged in one direction. For instance, the one horizontal line consists of 2500 pixels, and makes 0–800 pixels, 800–1650 pixels and 1700–2500 pixels correspond to the B light, the G light and the R light. Further, as mentioned hereinafter, 801–849 pixels and 1651–1699 pixels are invalid widths 53a and 53b.

The main control unit 16 reads a electric charge of one horizontal line accumulated in each pixel of the CCD 15. Namely, the main control unit 16 obtains a color image by reading the R signal, the G signal and the B signal at the same time.

Besides, the main control unit 16 outputs a lighting signal to the daylight fluorescent lamp 11, and outputs a reading initiation signal to the CCD 15. The main control unit 16 outputs a moving signal for moving the manuscript 18 and a stop signal for stopping the moving of the manuscript 18 to the manuscript-platform-moving-unit 17.

Then, a method for reading color images which is realized by the device for reading color images of the embodiment 2 constructed in the above-mentioned way will be described by referring to the drawings from FIG. 3 to FIG. 9.

First of all, a white light including the RGB light is irradiated to the manuscript 18 by lighting the daylight fluorescent lamp, after a lighting signal is transmitted from the main control unit 16 to the daylight fluorescent lamp 11 (Step 201). Besides, the manuscript moving unit 17 moves the manuscript 18 at a predetermined speed, for instance, to the left direction after the moving signal is transmitted from the main control unit 16 to the manuscript-platform-moving-unit 17 (Step 202).

At this moment, the CCD 15 starts the scanning synchronizing with the moving of the manuscript 18 by the manuscript-platform-moving-unit 17, after the main control unit 16 outputs a reading initiation signal for reading the manuscript 18 per line to the CCD 15 (Step 203).

As shown in FIG. 4, the RGB light reflected from the manuscript 18 is inputted in the optical input unit 1 between the aerial reading reflection mirror 12a and the aerial reading reflection mirror 12b (Step 204). Then, as shown in FIG. 5, the RGB light of the optical path LG inputted from the valid reading width 51 is resolved by the G resolution filter 13G into only the G light (Step 205). The resolved G light is inputted into the central area GA of the CCD 15 through the lens 14 (Step 206). The G signal is obtained in the central area GA of the CCD 15 (Step 207).

At this moment, the light of point $b_1$ of left edge of the valid reading width 51 is formed as an image in the point $c_1$ of right edge of the central area GA of the CCD 15. The light of point $b_n$ of right edge of the valid reading width 51 is formed as an image in the point $c_n$ of left edge of the central area GA of the CCD 15.

On the other hand, as shown in FIG. 6, the RGB light of the third optical path LB is reflected by the aerial reading reflection mirror 12b to be radiated to the optical resolution filter 13B. The RGB light of the optical path LB is resolved by the B resolution filter 13B into only the B light (Step 205). The resolved B light is inputted into the left area BA of the CCD 15 through the lens 14 (Step 206). The B signal is obtained in the left area BA of the CCD 15 (Step 207).

In this case, the point $a_1$ on the aerial reading width 52b is returned to the point $b_1$ on the valid reading width 51, and the light inputted into the point $a_1$ is reflected by the point $d_1$ to be formed as a image in the point $c_1$ of the left area BA of the CCD 15. The fact is equivalent to the fact that the light inputted from the aerial point $a_1$ is formed as an image in the point $c_1$ through the point $d_1$. Similarly, the point $a_n$ on the aerial reading width is returned to the point $b_n$ on the valid reading width, and the light inputted into the point $a_n$ is reflected by the point $d_n$ to be formed as an image in the point $c_n$ of the left area BA of the CCD 15.

Further, as shown in FIG. 7, the RGB light of the second optical path LR is reflected by the aerial reading reflection mirror 12a to be radiated to the optical resolution filter 13R. The RGB light of the optical path LR is resolved by the R resolution filter 13R into only the R light (Step 205). The resolved R light is inputted into the right area RA of the CCD 15 through the lens 14 (Step 206). The R signal is obtained in the right area RA of the CCD 15 (Step 207).

In this case, the point $A_1$ on the aerial reading width 52a is returned to the point $b_1$ on the valid reading width, and the light inputted into the point $A_1$ is reflected by the point $D_1$ to be formed as an image in the point $c_1$ of the right area RA of the CCD 15. The point $A_n$ on the aerial reading width is returned to the point $b_n$ on the valid reading width, and the light inputted into the point An is reflected by the point $D_n$ to be formed as an image in the point $c_n$ of the right area RA of the CCD 15.

By these actions, the signal resolved into a R signal, a G signal and a B signal by the aerial reading reflection mirrors 12a and 12b and the optical resolution filter 13 can be obtained on one line of the CCD 15 at the same time. Then, the main control unit 16 obtains a color signal by reading the R signal, G signal and the B signal converted by the CCD 15 at the same time.

Figure 9:
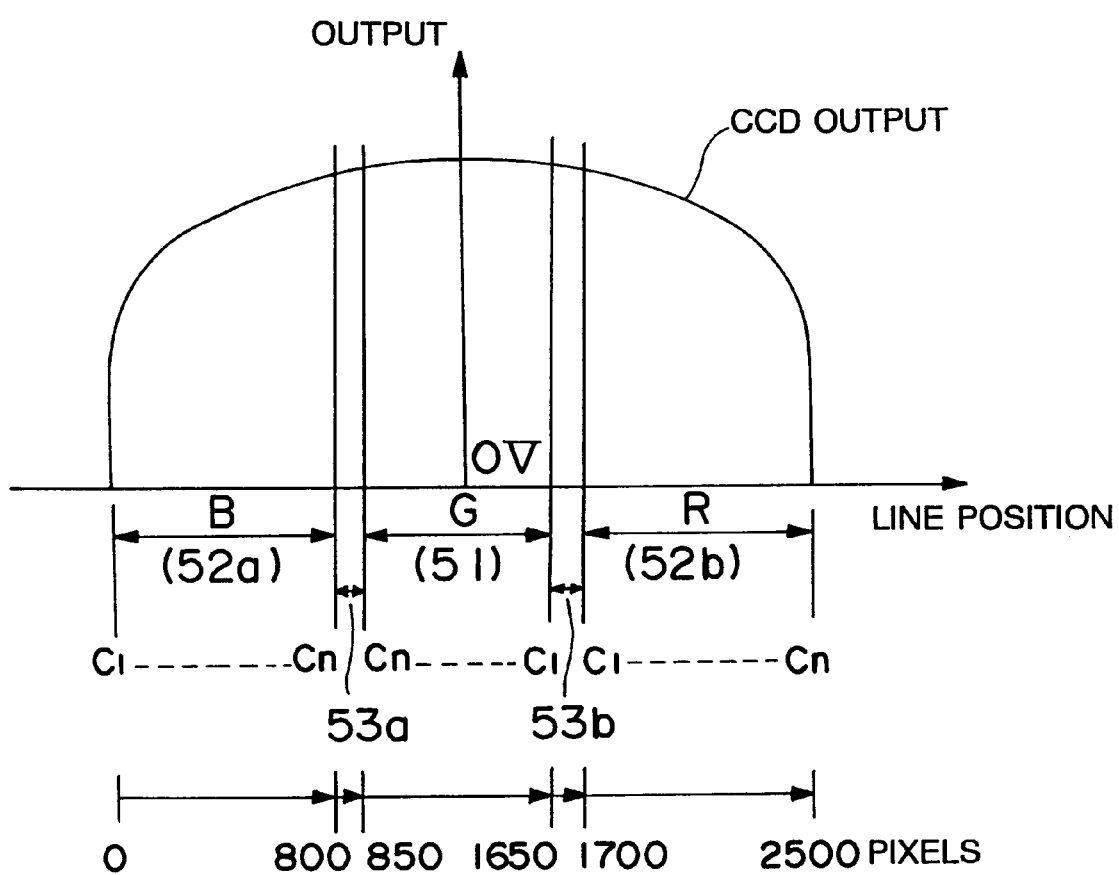
FIG. 9 is a diagram indicating an output of a color signal of one line.

For instance, as shown in FIG. 9, the color signal consisting of the R signal, G signal and the B signal of 2500 pixels can be obtained. The B output and the R output of the color signal decrease as they get near the edge, even though the G output of the color signal is almost a constant value.

Besides, the invalid widths 53a and 53b exist on the both sides of the G output. The invalid widths 53a and 53b are the parts which do not relate to the aerial reading reflection mirrors 12a and 12b. The color signal is outputted from the CCD 15 and is image-processed by the main control unit 16.

Further, the manuscript 18 will be stopped, if the main control unit 16 transmits a stop signal to the CCD 15 and the manuscript platform moving unit 17 after the CCD 15 reads the predetermined number of lines from the manuscript 18, when the manuscript platform moving unit 17 moves the manuscript 18 to the left direction.

As mentioned hereinbefore, according to the embodiment 2, the R signal, the G signal and the B signal are read at the same time without moving the optical resolution filter 13 in one scanning. For this reason, the color image can be read at a high speed. Besides, a device for reading color images whose construction is simple and which is low-priced can be provided, since only one daylight fluorescent lamp 11 is employed.

Besides, in the embodiment 2, a reflection mirror 20 is included so as to input the RGB light reflected from the aerial reading reflection mirrors 12a and 12b into the optical resolution filter 13. For instance, the aerial reading reflection mirrors 12a and 12b, the optical resolution filter 13, the lens 14 and the CCD 15 can be arranged on the same line without installing the reflection mirror 20, when there is enough space in the device for reading color images.

Further, in the embodiment 2, the optical resolution filters are arranged in order of R, G and B in the optical resolution filter 13. The order of the RGB can be changed. For instance, the optical resolution filters also can be arranged in such orders as RBG and BRG, as long as the R signal, the G signal and the B signal can be obtained.

<EMBODIMENT 3>

Figure 10:
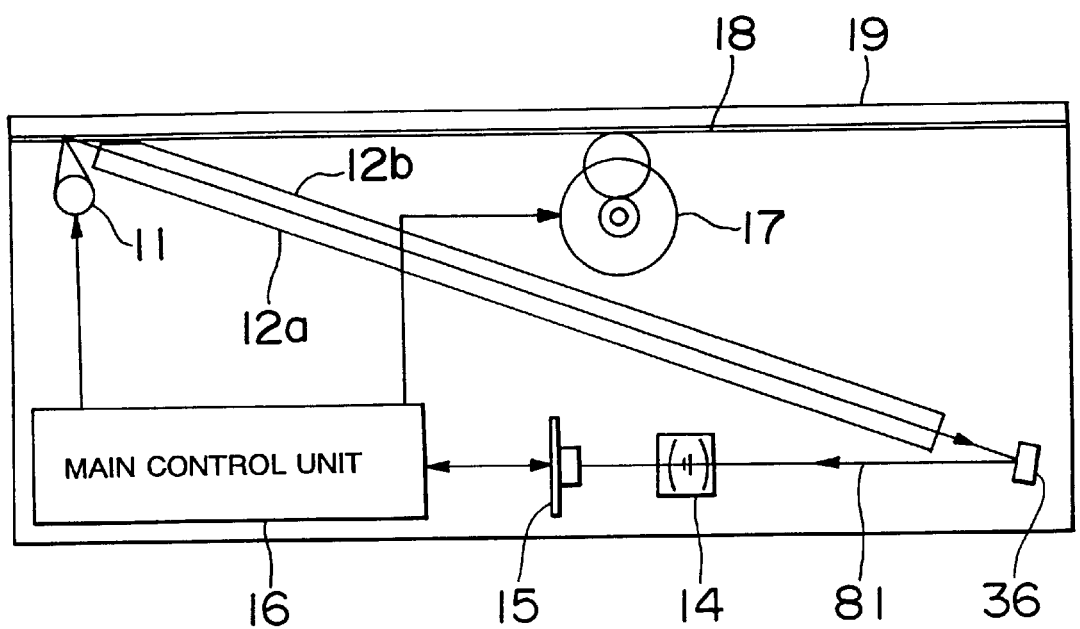
FIG. 10 is a construction diagram indicating a device for reading color images according to the the third embodiment of the present invention.

Then, the embodiment 3 of the present invention will be described. A device for reading color images according to the embodiment 3 of the present invention is shown in FIG. 10. A strabismus diagram of the device for reading color images according to embodiment 3 is shown in FIG. 11.

In the embodiment 2, the reflection mirror 20 and the optical resolution filter 13 are used. In the embodiment 3, a dichroic mirror 36 which executes an optical resolution and reflects only the resolved light is used in place of the reflection mirror 20 and the optical resolution filter 13.

Figure 11:
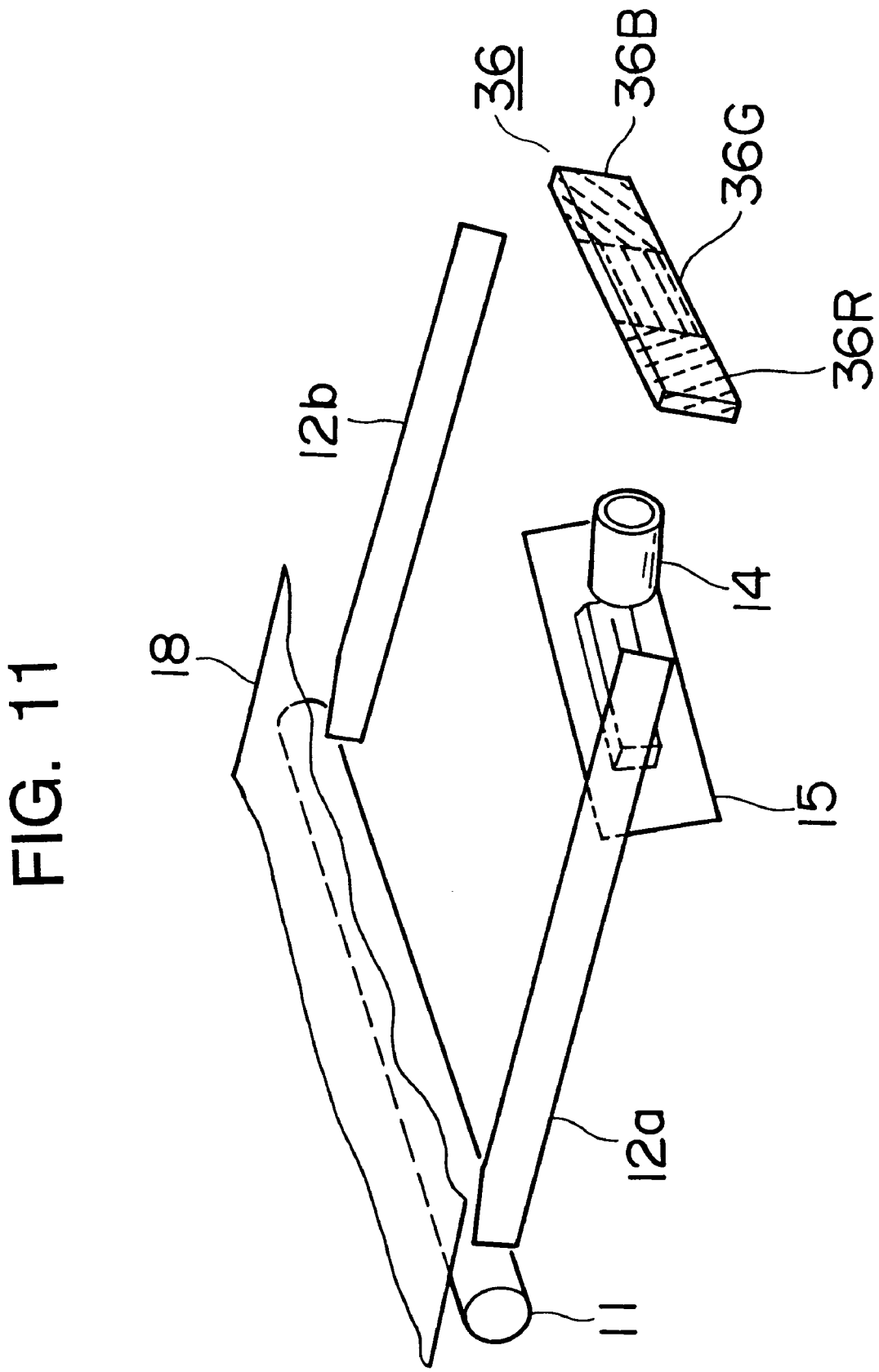
FIG. 11 is a strabismus diagram of a device for reading color images according to the third embodiment of the present invention.

As shown in FIG. 11, the daylight fluorescent lamp 11 is arranged in the direction which is perpendicular to the left and right direction (a plurality of line directions) to which the manuscript-platform-moving-unit 17 moves the manuscript 18, namely, the daylight fluorescent lamp 11 is arranged along one line scanning direction. The aerial reading reflection mirror 12a and the aerial reading reflection mirror 12b are arranged facing each other at a distance of the valid reading width 51 of the manuscript 18.

The dichroic mirror 36 comprises a R resolution reflection filter 36R, a G resolution reflection filter 36G and a B resolution reflection filter 36B, and they are arranged in one line scanning direction of the manuscript 18.

The B resolution reflection filter 36B permeates the G light and the R light of the RGB light and reflects only the B light toward the lens 14. The G resolution reflection filter 36G permeates the B light and the R light of the RGB light and reflects only the G light toward the lens 14. The R resolution reflection filter 36R permeates the B light and the G light of the RGB light and reflects only the R light toward the lens 14.

As shown in FIG. 10 and FIG. 11, each of the lens 14 and the CCD 15 is arranged on the optical path 81 of the R light, the G light and the B light reflected from the dichroic mirror 36. Namely, the space of the device can be kept small, since each of the lens 14 and the CCD 15 is arranged on the side of the aerial reading reflection mirrors 12a and 12b by installing the dichroic mirror 36.

Further, the other constructions are the same as those of the embodiment 2, and the identical parts will be described by adding the identical codes to them.

Then, the method for reading color images of the embodiment 3 constructed in the above-mentioned way will be described by referring to the drawings from FIG. 10 to FIG. 14. First of all, a white light including the RGB light is irradiated to the manuscript 18 by lighting the daylight fluorescent lamp 11, after a lighting signal is transmitted from the main control unit 16 to the daylight fluorescent lamp 11 (Step 301).

Figure 13:
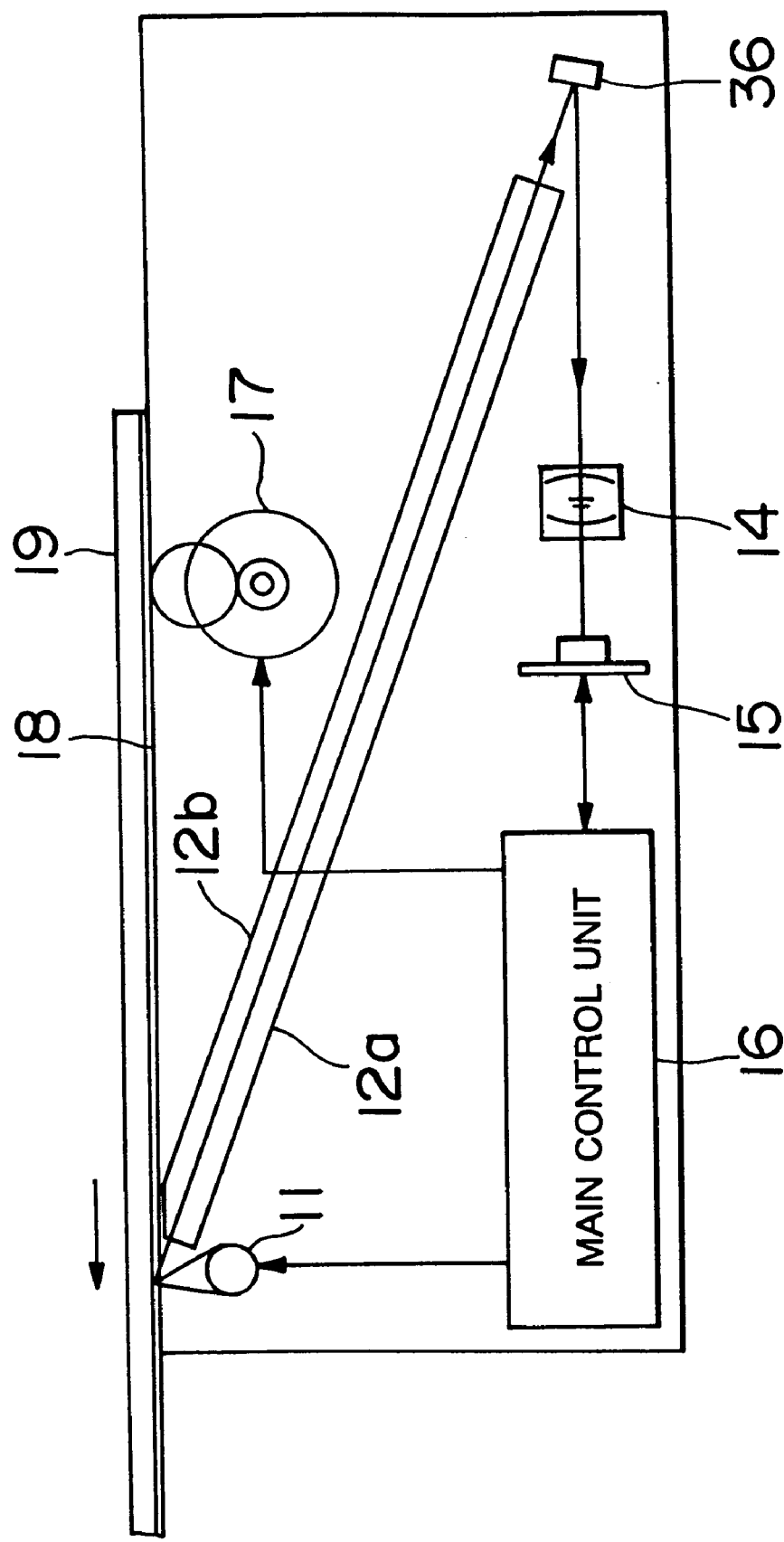
FIG. 13 is a diagram indicating a reading of a color image when a manuscript is moved in the third embodiment of the present invention.
Figure 14:
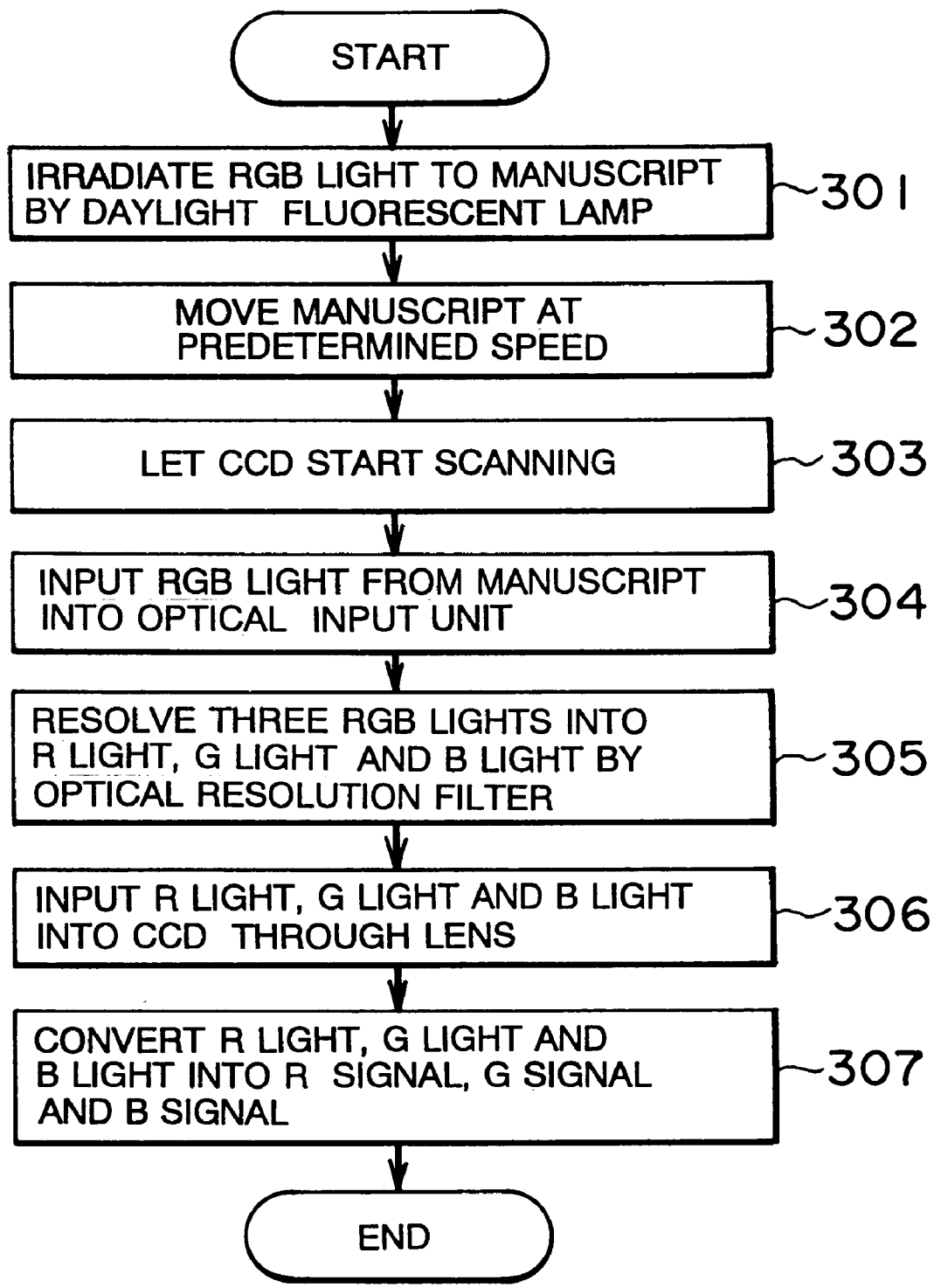
FIG. 14 is a flowchart indicating a method for reading color images according to the third embodiment of the present invention.

Besides, the manuscript platform moving unit 17 moves the manuscript 18 in a predetermined speed, for instance, as shown in FIG. 13, to the left direction, after a moving signal is transmitted from the main control unit 16 to the manuscript platform moving unit 17 (Step 302).

At this moment, the CCD 15 starts scanning synchronizing with the moving of the manuscript 18 by the manuscript platform moving unit 17, after the main control unit 16 outputs a reading initiation signal for reading the manuscript 18 per line to the CCD 15 (Step 303).

Figure 12:
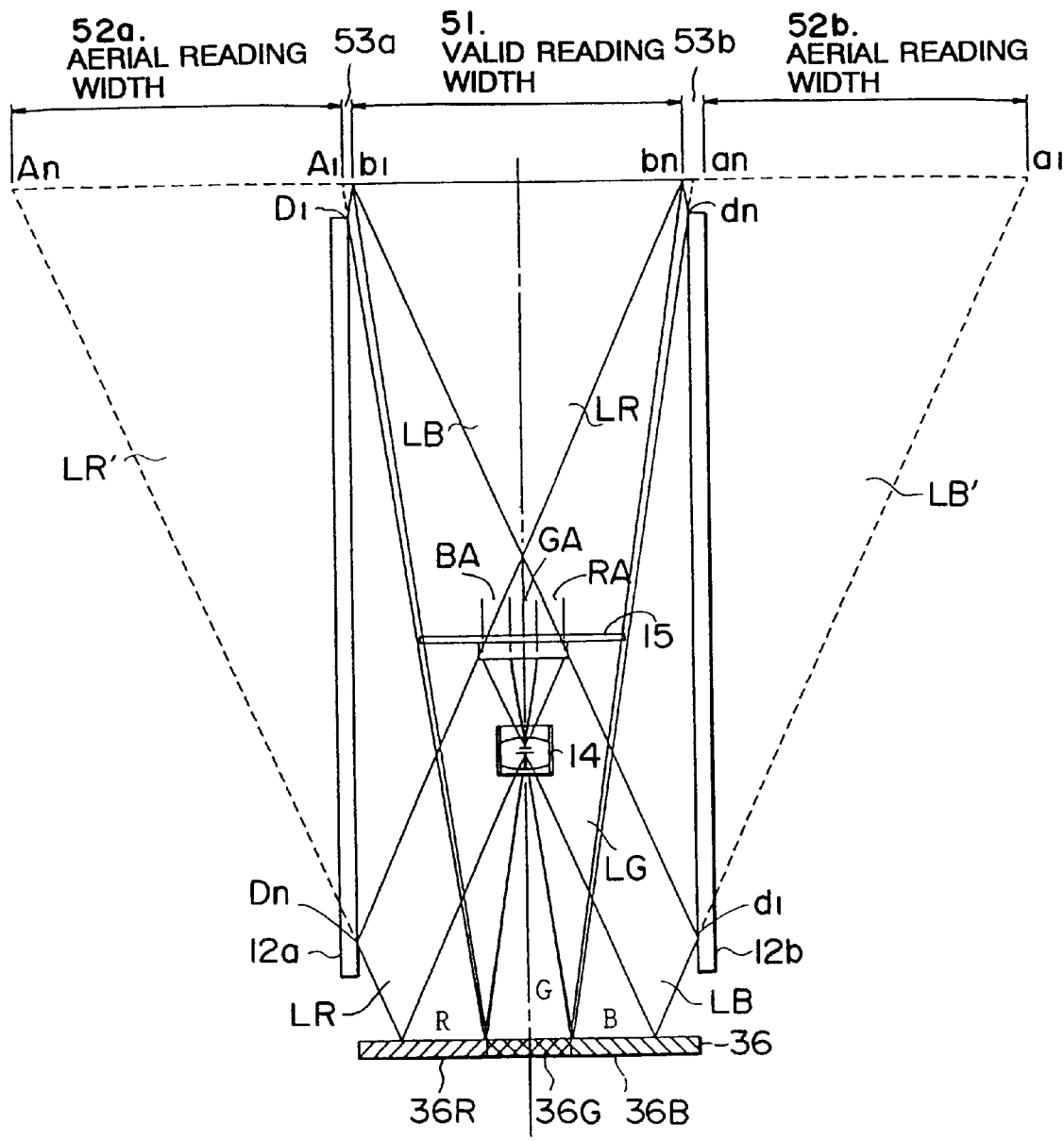
FIG. 12 is a construction diagram indicating the principle parts of the device for reading color images according to the third embodiment of the present invention.

In this case, as shown in FIG. 12, the RGB light reflected from the manuscript 18 is inputted by the optical input unit 1 between the aerial reflection mirror 12a and the aerial reflection mirror 12b (Step 304).

Then, as shown in FIG. 12, the G resolution reflection filter 36G resolves the RGB light of the optical path LG inputted from the valid reading width 51 into only the G light, and reflects the resolved G light (Step 305).

The reflected G light is inputted into the central area GA of the CCD 15 through the lens 14 (Step 306). The G signal is obtained in the area GA of the CCD 15 (Step 307).

On the other hand, the RGB light of the third optical path LB is reflected by the aerial reading reflection mirror 12b to be radiated to the B resolution reflection filter 36B. The B resolution reflection filter 36B resolves the RGB light of the optical path LB into a B light and reflects the resolved B light (Step 305). The reflected B light is inputted into the left area BA of the CCD 15 through the lens 14 (Step 306). The B signal is obtained in the area BA of the CCD 15 (Step 307).

Besides, the RGB light of the second optical path LR is reflected by the aerial reading reflection mirror 12a to be radiated to the R resolution reflection filter 36R. The R resolution reflection filter 36R resolves the RGB light of the optical path LR into a R light and reflects the resolved R light (Step 305). The reflected R light is inputted into the right area RA of the CCD 15 through the lens 14 (Step 306). The R signal is obtained in the area RA of the CCD 15 (Step 307).

By these actions, the signal resolved into the R signal, the G signal and the B signal can be obtained at the same time on one line of the CCD 15. Then, the main control unit 16 receives a color signal by reading the R signal, the G signal and the B signal converted by the CCD 15.

According to the embodiment 2, the R signal, the G signal and the B signal are read at the same time without moving the dichroic mirror 36 in one scanning. For this reason, the color image can be read at a high speed. Besides, the device for reading color images whose construction is simple and which is low-priced can be provided, since only one daylight fluorescent lamp 11 is employed.

Further, the construction of the embodiment 3 is simpler than the construction of the embodiment 2, since the dichroic mirror 36 is used in place of the reflection mirror 20 and the optical resolution filter 13 of the embodiment 2.

<EMBODIMENT 4>

Figure 15:
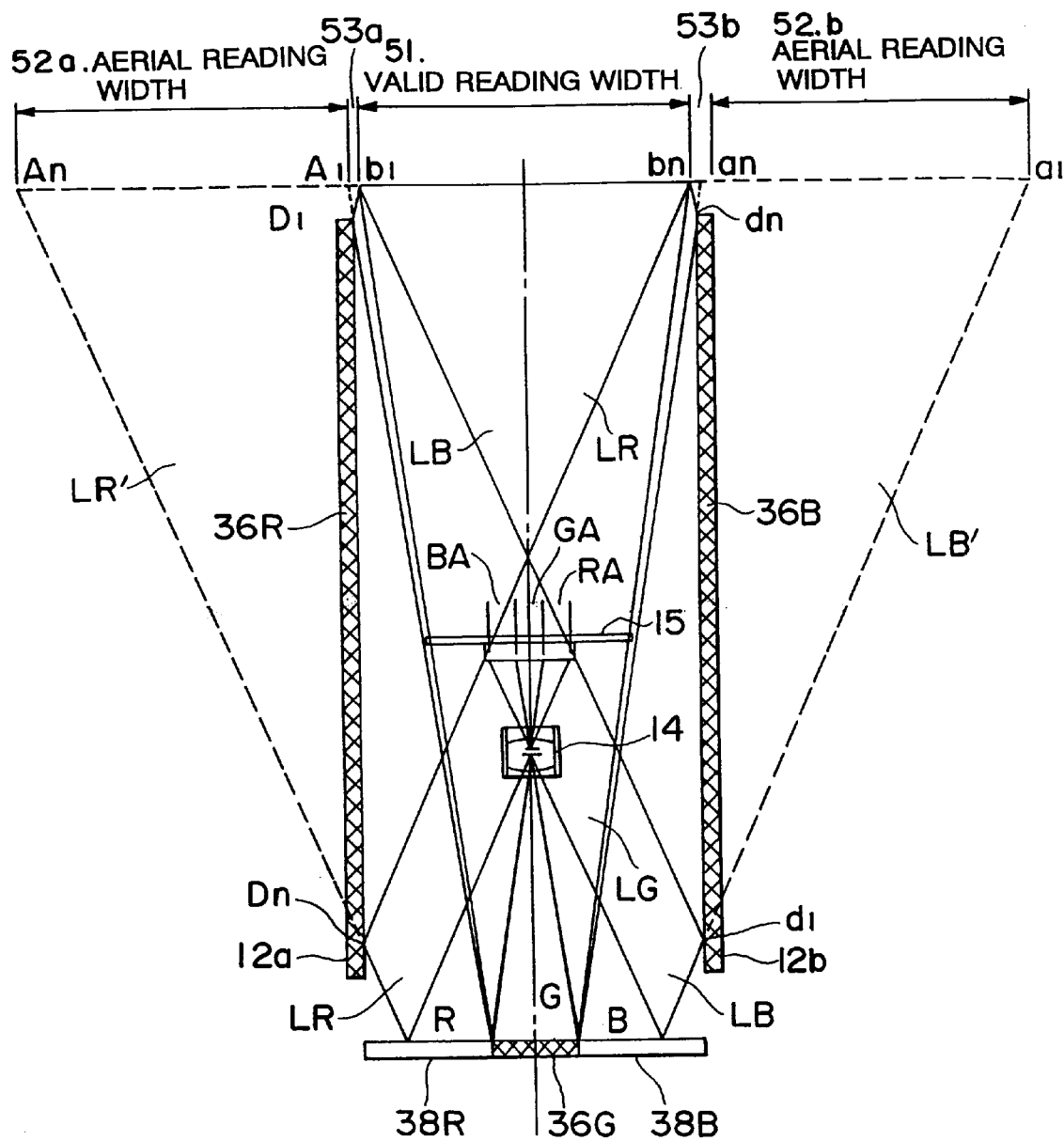
FIG. 15 is a construction diagram indicating the principle parts of the device for reading color images according to the fourth embodiment of the present invention.

Then, the embodiment 4 of the present invention will be described. The principle parts of the device for reading color images according to the embodiment 4 of the present invention are shown in FIG. 15. In the embodiment 4, the R resolution reflection filter 36R is installed in the position of the aerial reading reflection mirror 12a shown in the embodiment 2. The B resolution reflection filter 36B is installed in the position of the aerial reading reflection mirror 12b.

Besides, the G resolution reflection filter 36G is arranged corresponding to the optical path LG of the valid reading width 51. The R resolution reflection filter 36R, the G resolution reflection filter 36G and the B resolution reflection filter 36B are the dichroic mirror 36 shown in the embodiment 3, and own the same constructions and the same functions.

Further, a regular mirror 38R is arranged corresponding to the optical path LR2 of the aerial reading width 52a. A regular mirror 38B is arranged corresponding to the optical path LB2 of the aerial reading width 52b.

Besides, the lens 14 and the CCD 15 are installed on the side of R resolution reflection filter 36R and the B resolution reflection filter 36B. Further, the other constructions are the same as those of the embodiment 2, and the identical parts will be described by adding the identical codes to them.

Figure 16:
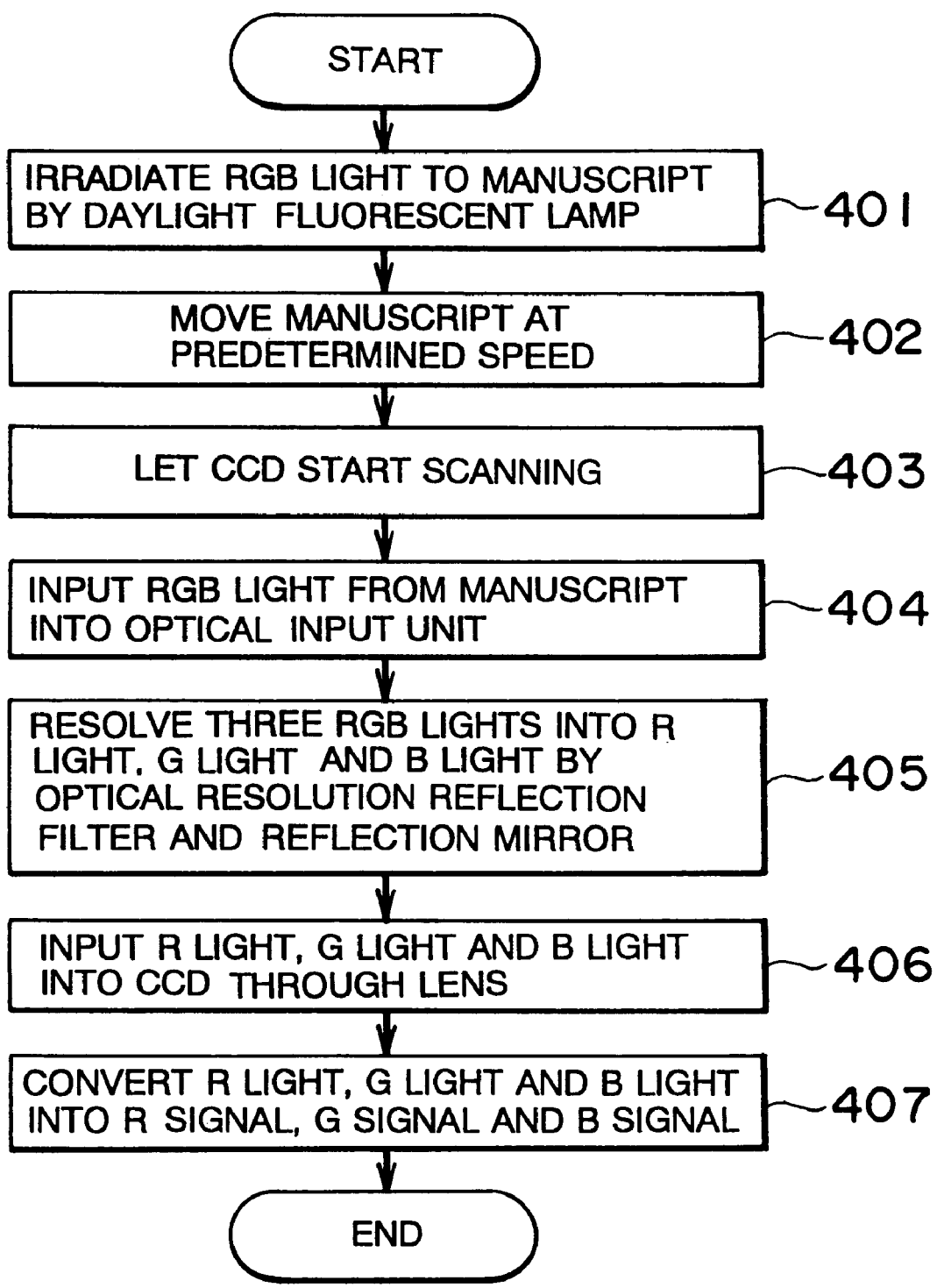
FIG. 16 is a flowchart indicating a method for reading color images according to the embodiment 4 of the present invention.
Figure 17:
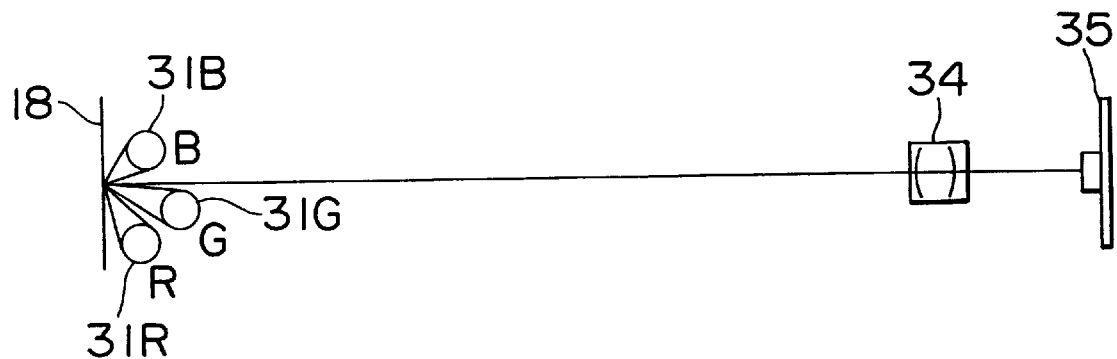
FIG. 17 is a diagram indicating one example of a traditional device for reading color images using three light sources.
Figure 18:
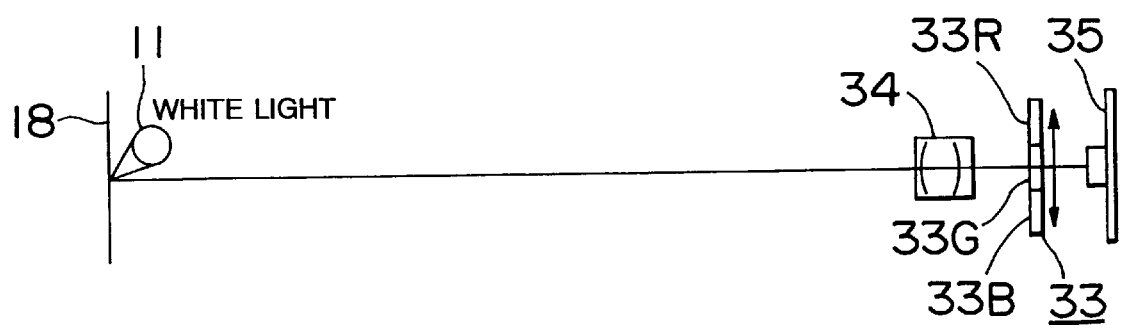
FIG. 18 is a diagram indicating one example of a traditional device for reading color images using an optical resolution filter.
Figure 19:
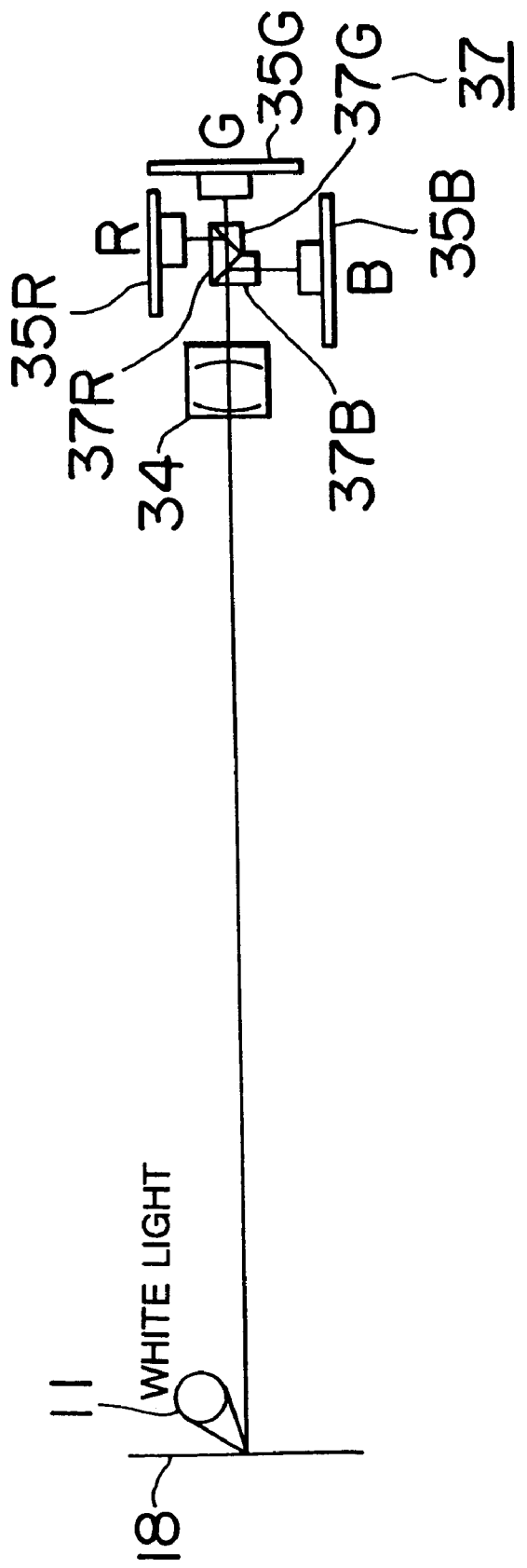
FIG. 19 is a diagram indicating one example of a traditional device for reading color images using a dichroic mirror.
Figure 20:
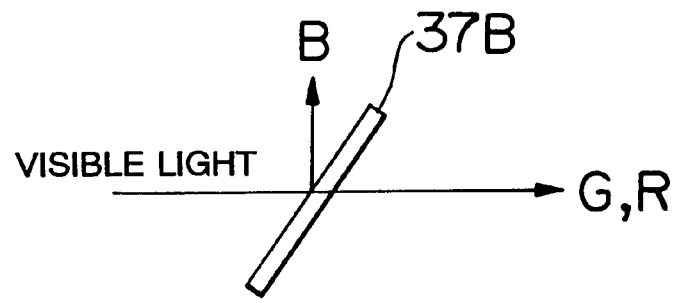
FIGS. 20(a–c) are construction diagrams indicating the dichroic mirror, FIG. 20A indicates a B resolution reflection filter, FIG. 20B indicates a G resolution reflection filter
Figure 20:
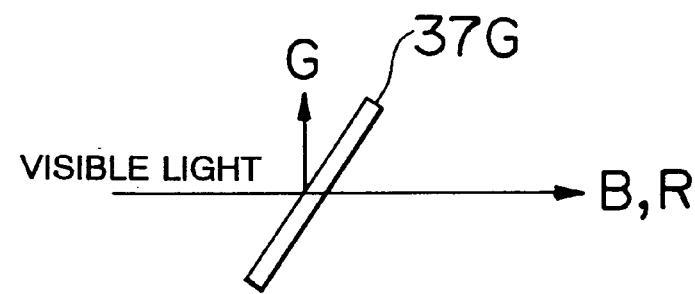
Figure 20:
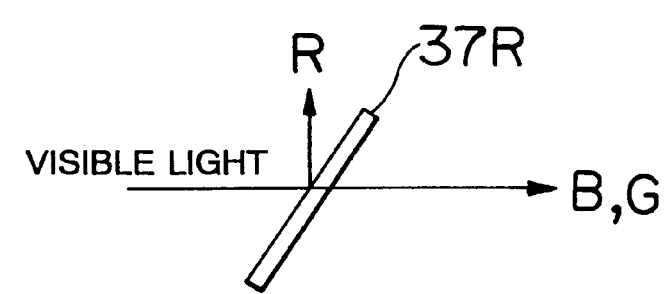

Then, the method for reading color images of the embodiment 4 constructed in the above-mentioned way will be described by referring to FIG. 15 and FIG. 16.

First of all, a white light including the RGB light is irradiated to the manuscript 18 by lighting the daylight fluorescent lamp 11, after a lighting signal is transmitted from the main control unit 16 to the daylight fluorescent lamp 11 (Step 401).

Besides, the manuscript platform moving unit 17 moves the manuscript 18 at a predetermined speed, for instance, to the left direction after a moving signal is transmitted from the main control unit 16 to the manuscript platform moving unit 17 (Step 402).

At this moment, the CCD 15 starts scanning synchronizing with the moving of the manuscript 18 by the manuscript platform moving unit 17, after a reading initiation signal for reading the manuscript 18 per line is outputted from the main control unit 16 to the CCD 15 (Step 403).

In this case, as shown in FIG. 15, the RGB light reflected from the manuscript 18 is inputted between the R resolution reflection filter 36R and the B resolution reflection filter 36B (Step 404).

Then, as shown in FIG. 15, the RGB light of the optical path LG inputted from the valid reading width 51 is resolved by the G resolution reflection filter 36G into a G light to be reflected (Step 405). The reflected G light is inputted into the central area GA of the CCD 15 through the lens 14 (Step 406). The G signal is obtained in the area GA of the CCD 15 (Step 407).

On the other hand, the RGB light of the third optical path LB is resolved by the B resolution reflection filter 36B into a B light to be reflected, and the reflected B light is reflected by the mirror 38B toward the lens 14 (Step 405). Further, the reflected B light is inputted into the left area BA of the CCD 15 through the lens 14 (Step 406). The B signal is obtained in the area BA of the CCD 15 (Step 407).

Further, the second optical path LR is resolved by the R resolution reflection filter 36R into a R light to be reflected, and the reflected R light is reflected by the mirror 38R toward the lens 14 (Step 405). Further, the reflected R light is inputted into the right area RA of the CCD 15 through the lens 14 (Step 406). The R signal is obtained in the area RA of the CCD 15 (Step 407).

By these actions, the signal resolved into the R signal, the G signal and the B signal can be obtained on one line of the CCD 15 at the same time. Then, the main control unit 16 obtains the color signal by reading the R signal, the G signal and the B signal converted by the CCD 15 at the same time.

According to the embodiment 4, the R signal, the G signal and the B signal are read at the same time without moving the dichroic mirror 36 and the mirror 38R and 38B in one scanning. For this reason, the color image can be read at a high speed. Besides, the device for reading color images whose construction is simple and which is low-priced can be provided, since only one daylight fluorescent lamp 11 is used.

What is claimed is:

1. A device for reading color images, comprising:

an optical input unit having a predetermined valid reading width for inputting three colors of RGB concurrently, said optical input unit comprising reflectors arranged facing each other at a distance substantially equal to the predetermined valid reading width;

a first optical path for radiating an RGB light input from said optical input unit;

a second optical path for radiating an RGB light input from said optical input unit in a path different than the first optical path;

a third optical path for radiating an RGB light input from said optical input unit in a path different than the first optical path and the second optical path;

an optical resolution unit receiving three RGB lights that are incident to said optical input unit through the first optical path, the second optical path and the third optical path to resolve one of the three RGB lights into an R light, resolve one of remaining two RGB lights into a G light and resolve the other one into a B light; and a photoelectric conversion unit comprising an R reading pixel, a G reading pixel and a B reading pixel corresponding to the R light, the G light and the B light obtained in said optical resolution unit, and converting the R light, the G light and the B light into an R signal, a G signal and a B signal.

2. A device for reading color images according to claim 1, wherein the first optical path radiates the RGB light input from the valid reading width directly to said optical resolution unit;

the second optical path reflects the RGB light input from said optical input unit in one of said reflectors and radiates the reflected RGB light to said optical resolution unit, and the RGB light of the second optical path appears to have been transmitted straight from a direction of an aerial optical input unit which is adjacent to the one of the reflectors and whose width is the same as the valid reading width, when the second optical path is viewed reversely from said optical resolution unit; and the third optical path reflects the RGB light input from said optical input unit in other of said reflectors and radiates the reflection RGB light to said optical resolution unit, and the RGB light of the third optical path appears to have been transmitted straight from a direction of another aerial optical input unit which is adjacent to the other of said reflectors and whose width is the same as the valid reading width, when the third optical path is viewed reversely from said optical resolution unit.

3. A device for reading color images according to claim 1, wherein one of said reflectors comprises a first resolution reflection filter resolving the RGB light of the second optical path into one of the R light, the G light and the B light and reflecting resolved light, and the other one of said reflectors comprises a second resolution reflection filter resolving the RGB light of the third optical path into one of the remaining two lights except one light resolved by said first resolution reflection filter and reflects resolved light, when said optical input unit and said photoelectric conversion unit are not arranged facing each other; and said optical resolution unit comprises:
a third resolution reflection filter resolving the RGB light of the first optical path into light of the other one except the resolved two lights and reflects resolved light toward said photoelectric conversion unit;
a first reflection mirror reflecting the light reflected from said first resolution reflection filter toward said photoelectric conversion unit; and
a second reflection mirror reflecting the light reflected from said second resolution reflection filter toward said photoelectric conversion unit.

4. A device for reading color images according to claim 3, wherein the width of the third resolution reflection filter is set equal to a width which is wider when the RGB light of the first optical path passes through the filter; and
the widths of the first and the second reflection mirror are set equal to a width which is wider than the width, when the light reflected from the resolution reflection filter corresponding to the reflection mirror is reflected by the reflection mirror.

5. A device for reading color images according to claim 1, wherein said optical resolution unit comprises an optical resolution reflection filter which receives three RGB lights that are incident into said optical input unit through the first optical path, the second optical path and the third optical path to resolve one of the three RGB lights into the R light, resolve one of the remaining two RGB lights into the G light, resolve the other one into the B light and reflect the resolved R light, G light and B light so that the R light, the G light and the B light are changed directing to said photoelectric conversion unit, when said optical input and said photoelectric conversion unit are not arranged facing each other.

6. A device for reading color images according to claim 5, wherein the optical resolution reflection filter comprises:
an R resolution reflection filter resolving the RGB light into the R light and reflecting resolved R light;
a G resolution reflection filter resolving the RGB light into the G light and reflecting resolved G light; and
a B resolution reflection filter resolving the RGB light into the B light and reflecting resolved G light, and the width of each resolution filter is set equal to a width which is wider than the width when the RGB light of the optical path corresponding to the filter passes through the filter.

7. A device for reading color images according to claim 5, wherein the optical resolution reflection filter comprises a dichroic mirror.

8. A device for reading color images, comprising:
an optical input unit having a constant valid reading width for inputting three colors of RGB concurrently;
a first optical path radiating an RGB light input from said optical input unit;
a second optical path radiating an RGB light input from said optical input unit in a path different than the first optical path;
a third optical path radiating an RGB light input from said optical input unit in a path different than the first optical path and the second optical path;
an optical resolution unit receiving three RGB lights that are incident to said optical input unit through the first optical path, the second optical path, and the third optical path, respectively, to resolve one of the three RGB lights into an R light, resolve one of remaining two RGB lights into a G light and resolve the other one into a B light;
one photoelectric conversion unit comprising an R reading pixel, a G reading pixel and a B reading pixel corresponding to the R light, the G light and the B light obtained in said optical resolution unit, and converting the R light, the G light and the B light into an R signal, a G signal and a B signal, said photoelectric conversion unit comprising one charge coupled device for one scanning line which is constructed by arranging each pixel in one scanning direction;
one condensing lens condensing the R light, the G light and the B light obtained in said optical resolution unit into said photoelectric conversion unit; and
a reflection mirror changing optical paths and reflecting the three RGB lights of the first optical path, the second optical path and the third optical path so that the three RGB lights are changed directing to said optical resolution unit, when said optical input unit and said optical resolution unit are not arranged facing each other.

9. A device for reading color images, comprising:
an optical input unit having a predetermined valid reading width for inputting three colors of RGB concurrently;
a first optical path for radiating an RGB light input from said optical input unit;
a second optical path for radiating an RGB light input from said optical input unit in a path different than the first optical path;
a third optical path for radiating an RGB light input from said optical input unit in a path different than the first optical path and the second optical path;
an optical resolution unit receiving three RGB lights that are incident to said optical input unit through the first optical path, the second optical path and the third optical path to resolve one of the three RGB lights into an R light, resolve one of remaining two RGB lights into a G light and resolve the other one into a B light; and
a photoelectric conversion unit comprising an R reading pixel, a G reading pixel and a B reading pixel corresponding to the R light, the G light and the B light obtained in said optical resolution unit, and converting the R light, the G light and the B light into an R signal, a G signal and a B signal,
wherein said optical resolution unit comprises an R resolution filter, a G resolution filter and a B resolution filter, and the width of each resolution filter is set to a width which is wider than a width of an optical path of the light corresponding to the filter when the light corresponding to the filter passes through the filter.

10. A device for reading color images, comprising:

an optical input unit having a constant valid reading width for inputting three colors of RGB concurrently;

a first optical path radiating an RGB light input from said optical input unit;

a second optical path radiating an RGB light input from said optical input unit in a path different than the first optical path;

a third optical path radiating an RGB light input from said optical input unit in a path different than the first optical path and the second optical path:

an optical resolution unit receiving three RGB lights that are incident to said optical input unit through the first optical path, the second optical path, and the third optical path, respectively, to resolve one of the three RGB lights into an R light, resolve one of remaining two RGB lights into a G light and resolve the other one into a B light;

one photoelectric conversion unit comprising an R reading pixel, a G reading pixel and a B reading pixel corresponding to the R light, the G light and the B light obtained in said optical resolution unit, and converting the R light, the G light and the B light into an R signal, a G signal and a B signal, said photoelectric conversion unit comprising one charge coupled device for one scanning line which is constructed by arranging each pixel in one scanning direction;

one condensing lens condensing the R light, the G light and the B light obtained in said optical resolution unit into said photoelectric conversion unit; and a control unit obtaining a color image of one line by reading the R signal, the G signal and the B signal of one scanning line converted by said photoelectric conversion unit at the same time.

11. A method for reading color images, comprising:

an optical input step inputting three colors of RGB concurrently in constant valid reading width;

a branching step radiating the RGB light which is input by the valid reading width in three different, respective optical paths from a first optical path to a third optical path and branching the RGB light into three lights corresponding to the three different, respective optical paths;

a resolution step resolving one of the three RGB lights into an R light, resolving one of remaining two RGB lights into a G light, and resolving the other one into a B light;

a condensing step condensing resolved R light, G light and B light with one condensing lens; and a conversion step converting condensed, resolved R light, G light and B light into an R signal, a G signal and a B signal respectively with one charge coupled device for one scanning line which is constructed by arranging each pixel in one scanning direction and provided in one photoelectric conversion unit, wherein said resolution step resolves one of the three RGB lights into an R light by an optical resolution reflection filter, resolves one of the remaining two RGB lights into a G light and resolves the other one into a B light, and reflects resolved R light, G light and B light at the same time; and said conversion step converts reflected R light, G light and B light into an R signal, a G signal and a B signal, respectively.

12. A method for reading color images, comprising:

an optical input step inputting three colors of RGB concurrently in constant valid reading width;

a branching step radiating the RGB light which is input by the valid reading width in three different, respective optical paths from a first optical path to a third optical path and branching the RGB light into three lights corresponding to the three different, respective optical paths;

a resolution step resolving one of the three RGB lights into an R light, resolving one of remaining two RGB lights into a G light, and resolving the other one into a B light;

a condensing step condensing resolved R light, G light and B light with one condensing lens; and a conversion step converting condensed, resolved R light, G light and B light into an R signal, a G signal and a B signal respectively with one charge coupled device for one scanning line which is constructed by arranging each pixel in one scanning direction and provided in one photoelectric conversion unit, wherein said conversion step further reflects the three RGB lights of the first optical path, second optical path, and the third optical path, respectively, by the reflection mirror changing the optical paths, resolves one of reflected three RGB lights into an R light, resolves one of the remaining two RGB lights into a G light, and resolves the other into a B light.

13. A method for reading color images, comprising:

an optical input step inputting three colors of RGB concurrently in a predetermined valid reading width using reflectors arranged facing each other at a distance substantially equal to the predetermined valid reading width;

a branching step radiating the RGB light which is input by the valid reading width in three different optical paths from a first optical path to a third optical path and branching the RGB light into three lights;

a resolution step resolving one of the three RGB lights into an R light, resolving one of remaining two RGB lights into a G light and resolving the other one into a B light; and a conversion step converting resolved R light, G light and B light into a R signal, a G signal and a B signal respectively.

14. A method for reading color images according to claim 13, wherein said resolution step resolves the RGB light of the second optical path into one of an R light, a G light and a B light and reflects the resolved light by one of the reflectors, simultaneously with the reflection resolves the RGB light of the third optical path into one light of the remaining two lights except the one light resolved by the one of the reflectors and reflects the resolved light by the other of the reflectors, resolves the RGB light of the first optical path into the other one except resolved two lights and reflects the resolved light by an optical resolution reflection filter, and simultaneously with the reflection further reflects the two lights resolved and reflected in the second and the third optical path by a reflection mirror; and said conversion step converts reflected R light, G light and B light into an R signal, a G signal and a B signal respectively.

15. A method for reading color images according to claim 13, wherein the first optical path radiates the RGB light input by the valid reading width directly;

simultaneously with outgoing radiation of the first optical path, the second optical path reflects the RGB light input by the valid reading width in one of said reflectors arranged facing each other at a distance equal to the valid reading width and radiates the reflected RGB light, and the RGB light of the second optical path appears to have been transmitted straight from a direction of an aerial reading width which is adjacent to the one reflector and whose width is the same as the valid reading width, when the second optical path is viewed reversely from the side of the resolved light; and simultaneously with the outgoing radiation of the second optical path, the third optical path reflects the RGB light input by the valid reading width in other one of said reflectors and reflects the reflected RGB light, and the RGB light of the third optical path appears to have been transmitted straight from a direction of another aerial reading width which is adjacent to the other reflector and whose width is the same as the valid reading width, when the third optical path is viewed reversely from the side of the resolved light.

\* \* \* \* \*